(12) United States Patent
Kunisa

(10) Patent No.: US 7,321,666 B2
(45) Date of Patent: *Jan. 22, 2008

(54) MULTILAYERED DIGITAL WATERMARKING SYSTEM

(75) Inventor: Akiomi Kunisa, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 757 days.

This patent is subject to a terminal disclaimer.

(21) Appl. No.: 10/698,409

(22) Filed: Nov. 3, 2003

(65) Prior Publication Data

US 2004/0101160 A1 May 27, 2004

(30) Foreign Application Priority Data

| Nov. 8, 2002 | (JP) | ............................. 2002-325896 |
| Sep. 17, 2003 | (JP) | ............................. 2003-325141 |

(51) Int. Cl.
 *G06K 9/00* (2006.01)
 *H04L 9/00* (2006.01)

(52) U.S. Cl. .................. 382/100; 713/176; 380/268

(58) Field of Classification Search ................ 382/100; 713/176; 380/268
 See application file for complete search history.

(56) References Cited

U.S. PATENT DOCUMENTS

| 6,128,736 | A * | 10/2000 | Miller .......................... 713/176 |
| 6,285,774 | B1 * | 9/2001 | Schumann et al. .......... 382/100 |
| 6,345,100 | B1 * | 2/2002 | Levine ......................... 380/205 |
| 6,633,653 | B1 * | 10/2003 | Hobson et al. .............. 382/100 |
| 6,665,419 | B1 * | 12/2003 | Oami .......................... 382/100 |
| 6,674,861 | B1 * | 1/2004 | Xu et al. ..................... 380/252 |
| 6,757,405 | B1 * | 6/2004 | Muratani et al. ............ 382/100 |
| 6,768,807 | B1 * | 7/2004 | Muratani ..................... 382/100 |
| 7,095,872 | B2 * | 8/2006 | Najarian ...................... 382/100 |
| 7,127,744 | B2 * | 10/2006 | Levy ............................. 726/26 |
| 2001/0016049 | A1 * | 8/2001 | Nguyen ....................... 382/100 |
| 2001/0029580 | A1 * | 10/2001 | Moskowitz .................. 713/176 |
| 2001/0037456 | A1 * | 11/2001 | Levy ........................... 713/176 |

(Continued)

FOREIGN PATENT DOCUMENTS

JP 2000-287067 A 10/2000

(Continued)

OTHER PUBLICATIONS

Machine Translation of JP 2002-082612.*

(Continued)

*Primary Examiner*—Andrew W. Johns
*Assistant Examiner*—Anthony Mackowey
(74) *Attorney, Agent, or Firm*—McDermott Will & Emery LLP

(57) ABSTRACT

A digital watermarking apparatus that embeds two watermarks in host data is provided. The first watermarking block generates a plurality of watermarking location candidates of the first watermark, and embeds the first watermark into the respective location candidates of the host data, and then selects one candidate with a high level of robustness as the first watermarked host data. The second watermarking block scrambles the watermarking location information on the first watermark and thereby generates a plurality of the second watermark candidates. Then the second watermarking block embeds the respective second watermark candidates in the first watermarked host data and selects one candidate with a high level of robustness as the second watermarked host data.

4 Claims, 25 Drawing Sheets

U.S. PATENT DOCUMENTS

| | | |
|---|---|---|
| 2003/0133590 A1* | 7/2003 | Miller et al. ................. 382/100 |
| 2003/0149879 A1* | 8/2003 | Tian et al. .................. 713/176 |
| 2006/0056653 A1* | 3/2006 | Kunisa ....................... 382/100 |

FOREIGN PATENT DOCUMENTS

| | | |
|---|---|---|
| JP | P2000-287067 A | 10/2000 |
| JP | 2001-257865 A | 9/2001 |
| JP | P2001-257865 A | 9/2001 |
| JP | 2002-16891 A | 1/2002 |
| JP | P2002-16891 A | 1/2002 |
| JP | 2002-82612 | 3/2002 |

OTHER PUBLICATIONS

Japanese Office Action for Corresponding Application No. 2003-325141 Dispatched Dec. 12, 2006.

Japanese Office Action issued in corresponding Japanese Patent Application No. JP 2003-325141, dated Aug. 15, 2006.

Oogami et al., "Hybrid Two-Layered Digital Watermark", ITE Annual Convention 2002.

Japanese Office Action issued in corresponding Japanese Patent Application No. JP 2003-325141, dated Aug. 15, 2006.

* cited by examiner

MULTILAYERED DIGITAL WATERMARKING SYSTEM

BACKGROUND OF THE INVENTION

1. Field of the Invention

The present invention relates to a digital watermarking technology, and it particularly relates to an apparatus and method for embedding a digital watermark and an apparatus and method for extracting a digital watermark.

2. Description of the Related Art

The number of Internet users has rapidly increased in recent years and we are now entering the age of the broadband, or a new stage in the utilization of the Internet. Since communication bandwidth has greatly expanded in broadband communication, the distribution of items containing large bodies of data such as audio, still image, and video can be enjoyed with ease. When the distribution of such digital items becomes popular, a highly efficient method of protecting the copyright of their contents will be required.

In the present situation, the copyright is not protected well so that users can easily copy such contents distributed via the Internet. Therefore, technology for embedding information on the originator of the content and the user into the content as a digital watermark has been developed. By using this watermarking technology, it becomes possible to extract the digital watermark from the content distributed via the network, and thereby detect an illegal use and track the distribution route of an illegal copy.

In some conventional digital watermarking techniques, a digital watermark is embedded and thereafter meta-information for identifying the watermarking method of the digital watermark is embedded. For instance, see the references [1]-[3].

A double watermarking system in which different watermarking methods are utilized in a hybrid manner has been also proposed, for instance, in the reference [4].

A digital watermark is embedded in the content data in a way that the watermark is perceptually invisible to users in order to prevent malicious attacks. However, the content data will be subject to various operations during the distribution and utilization, for instance, signal processing such as compression, various types of filtering, modification by users, or attacks on the watermark information. In such processes, a part of the digital watermark may be possibly altered or removed. Therefore the digital watermark should be robust enough to withstand such operations.

In the references [1]-[3], some double watermarking methods are proposed by which two digital watermarks are embedded and the two watermarks are sequentially extracted, however, the two watermarks generally interfere with each other and therefore in some cases the watermarks cannot be extracted correctly. In the reference [4], a hybrid two-layered digital watermarking system is proposed to reduce the interference of the two watermarks. However, since the system limits the watermarking method available in the lower layer, it is not applicable to a general use.

Related art list:

[1] JP 2002-16891 A
[2] JP 2000-287067 A
[3] JP 2001-257865 A
[4] Oogami et al., "Hybrid Two-Layered Digital Watermark", ITE Annual Convention 2002.

SUMMARY OF THE INVENTION

The present invention has been made based on these considerations, and an object thereof is to provide a digital watermarking technology which can embed a watermark with a high degree of robustness and reduce the detection error rate of the embedded watermark. Another object is to provide a digital watermarking technology which can extract a watermark with a low detection error rate.

According to one aspect of the present invention, a digital watermark embedding apparatus is provided. The apparatus comprises a first embedding block which embeds a first digital watermark in a host data; and a second embedding block which embeds information on watermarking location of the first digital watermark, as a second watermark, into the host data in which the first digital watermark has been embedded.

The host data are original data in which the digital watermark is to be embedded, for instance, data such as still image, video, audio or the like. The digital watermark to be embedded includes identification information, originator information, user information on the original data, and so on. Furthermore, a digest on the host data, that is data plainly representing the characteristics of the host data, can be embedded as the digital watermark.

According to another aspect of the present invention, a digital watermark extracting apparatus is provided. The apparatus comprises a first extracting block which extracts a first digital watermark from a twice-watermarked host data and translates the first digital watermark into information on watermarking location of a second watermark; a removing unit which removes the first digital watermark from the host data; and a second extracting block which extracts the second digital watermark from the host data from which the first digital watermark has been removed by the removing unit according to the information on the watermarking location.

According to still another aspect of the present invention, a digital watermark extracting apparatus is also provided. The apparatus comprises a first extracting block which extracts a first digital watermark from a twice-watermarked host data; a first removing unit which removes the first digital watermark from the host data; a second extracting block which lies immediately posterior to the first extracting block and extracts a second digital watermark from the host data from which the first digital watermark has been removed by the first removing unit; and a second removing unit which removes the second digital watermark from the host data. The host data from which the second digital watermark has been removed by the second remover is fedback to the first extracting block, and the first extracting block extracts the first digital watermark from the host data from which the second digital watermark has been removed. Thereby the first digital watermark and the second digital watermark are iteratively decoded in sequence.

According to still another aspect of the present invention, a digital watermark extracting apparatus is also provided. The apparatus comprises a first extracting block which extracts a first digital watermark from a twice-watermarked host data; a first removing unit which removes the first digital watermark from the host data; a second extracting block extracts a second digital watermark from the host data; and a second removing unit which removes the second digital watermark from the host data. The host data from which the second digital watermark has been removed by the second remover is fedback to the first extracting block, and the first extracting block extracts the first digital watermark from the host data from which the second digital watermark has been removed. The host data from which the first digital watermark has been removed by the first remover is fedback to the second extracting block, and the second extracting block extracts the second digital watermark from the host data from which the first digital watermark has been removed. Thereby the first digital watermark and the second digital watermark are iteratively decoded in parallel.

According to still another aspect of the present invention, a data structure of a twice-watermarked host data readable and usable by a computer is provided. The data structure comprises two embedded digital watermarks, wherein information on watermarking location of a first digital watermark is embedded as a second digital watermark by a reversible watermarking method. Herein the order of embedding the first digital watermark and the second digital watermark is arbitrary.

According to still another aspect of the present invention, a digital watermark extracting method is provided. The method comprises extracting a first digital watermark embedded by a reversible watermarking method from a twice-watermarked host data and removing the extracted first digital watermark from the host data and thereafter extracting a second digital watermark from the host data. The second digital watermark may be embedded by an individual watermarking method, and the first digital watermark may be mete-information for identifying the watermarking method of the second watermark. Such meta-information may be standardized. In this case, the second digital watermark may be extracted from the host data by the method identified by the meta-information. The reversible watermarking method is a method in which the inverse transform of watermarking process is defined so that the embedded watermark can be removed completely or almost completely by the inverse transform.

According to still another aspect of the present invention, a digital watermark embedding method is provided. The method is for doubly watermarking a host data. The method comprises embedding information on watermarking location of a first digital watermark as a second watermark into the host data by a reversible watermarking method. Herein the order of embedding the first digital watermark and the second digital watermark is arbitrary. The second digital watermark may be embedded after the first digital watermark is embedded, however, the order of embedding the watermarks can be reversed. Namely, the watermarking location information on the first digital watermark may be embedded as the second watermark before the first digital watermark is embedded, and thereafter the first digital watermark may be embedded.

According to still another aspect of the present invention, a digital watermark embedding method is also provided. The method is for embedding two digital watermarks containing information with different degrees of importance into a host data. The method comprises embedding one digital watermark containing more important information with a higher degree of robustness into the host data. Herein the digital watermark containing more important information may be embedded before or after the other digital watermark is embedded. The digital watermark containing more important information may be embedded into the host data by a reversible watermarking method. The robustness of the digital watermark means to what extent the digital watermark can survive any kinds of operations against the watermarked host data, for instance, signal processing such as compression or filtering.

According to still another aspect of the present invention, a method for extracting two digital watermarks in sequence from a twice-watermarked host data by iterative decoding is provided. The method comprises a first watermark extracting process which estimates a first digital watermark from the twice-watermarked host data and removes the estimated first digital watermark from the twice-watermarked host data; a second watermark extracting process which estimates a second digital watermark from the host data from which the estimated first digital watermark has been removed and removes the estimated second digital watermark from the twice-watermarked host data; and a feedback process which feedbacks the host data from which the estimated second watermark has been removed to the first watermark extracting process. The first watermark extracting process estimates the first digital watermark from the twice-watermarked host data at a first iteration of the iterative decoding, and estimates the first digital watermark from the host data from which the estimated second digital watermark has been removed at a second iteration and afterwards.

According to still another aspect of the present invention, a method for extracting two digital watermarks in parallel from a twice-watermarked host data by iterative decoding is provided. The method comprises a first watermark extracting process which estimates a first digital watermark from the twice-watermarked host data and removes the estimated first digital watermark from the twice-watermarked host data; a second watermark extracting process which estimates a second digital watermark from the twice-watermarked host data and removes the estimated second digital watermark from the twice-watermarked host data; a feedback process which feedbacks the host data from which the estimated second watermark has been removed to the first watermark extracting process; and a feedback process which feedbacks the host data from which the estimated first watermark has been removed to the second watermark extracting process. The first watermark extracting process estimates the first digital watermark from the twice-watermarked host data at a first iteration of the iterative decoding, and estimates the first digital watermark from the host data from which the estimated second digital watermark has been removed at a second iteration and afterwards. The second watermark extracting process estimates the second digital watermark from the twice-watermarked host data at a first iteration of the iterative decoding, and estimates the second digital watermark from the host data from which the estimated first digital watermark has been removed at a second iteration and afterwards.

Moreover, any arbitrary replacement or substitution of the above-described structural components and the steps, expressions replaced or substituted in part or whole between a method and an apparatus as well as addition thereof, and expressions changed to a system, a computer program, a data structure, a storage medium, a transmission medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but to exemplify the invention.

Embodiment 1

Figure 1:
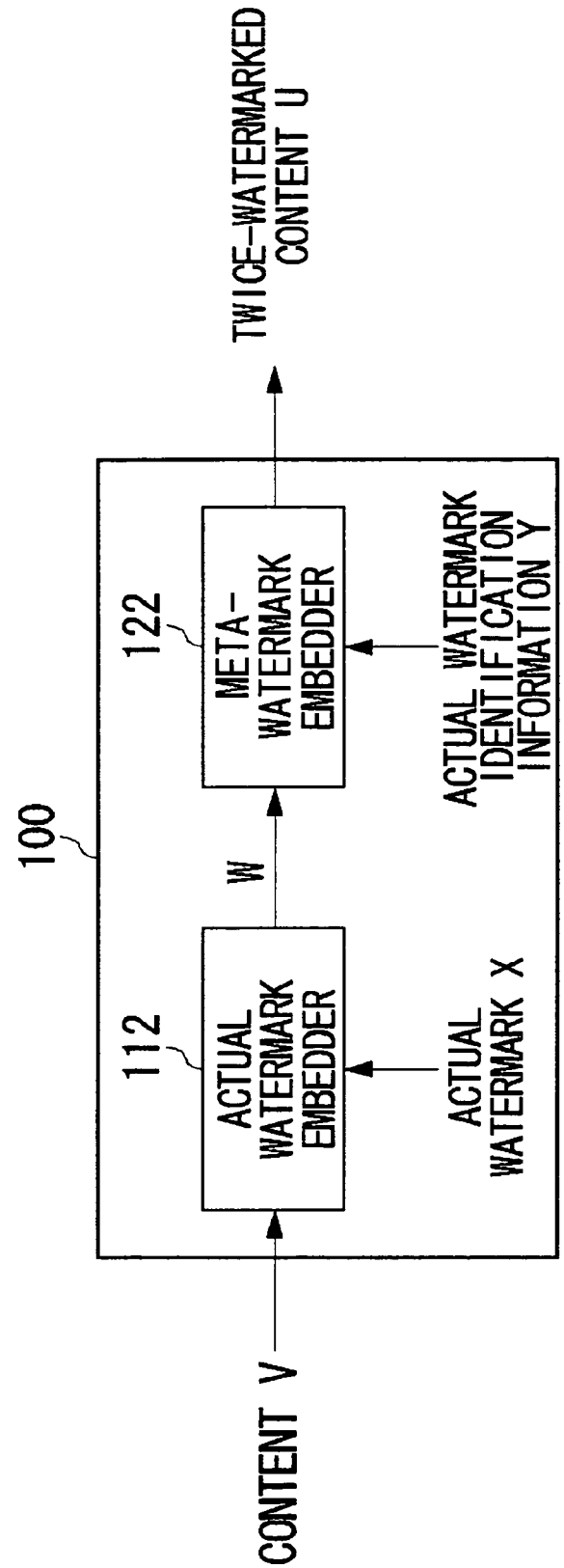
FIG. 1 shows a structure of a digital watermark embedding apparatus according to Embodiment 1.

FIG. 1 shows a structure of a digital watermark embedding apparatus 100 according to Embodiment 1. An actual-watermark embedder 112 embeds an actual watermark X into an input content V by a specific watermarking method and outputs an actual-watermarked content W. A meta-watermark embedder 122 embeds actual watermark identification information Y (hereinafter also called meta-watermark Y) for identifying the watermarking method of the actual watermark X into the actual-watermarked content W and thereby outputs a twice-watermarked content U in which the actual watermark X and the meta-watermark Y are embedded. In embedding the meta-watermark Y into the actual-watermarked content W, the meta-watermark embedder 122 adopts a reversible watermarking method, namely, a watermark is embedded in such a manner that the watermark can be removed from a watermarked media by the inverse transform of the watermarking process and the watermarked media can be restored to the original one.

In order to protect the copyright of the content V, the actual watermark X containing the identification information on the content is allowed to be embedded by various methods, while the meta-watermark Y containing the information for identifying the watermarking method of the actual watermark X is embedded by some common standardized methods.

Figure 2:
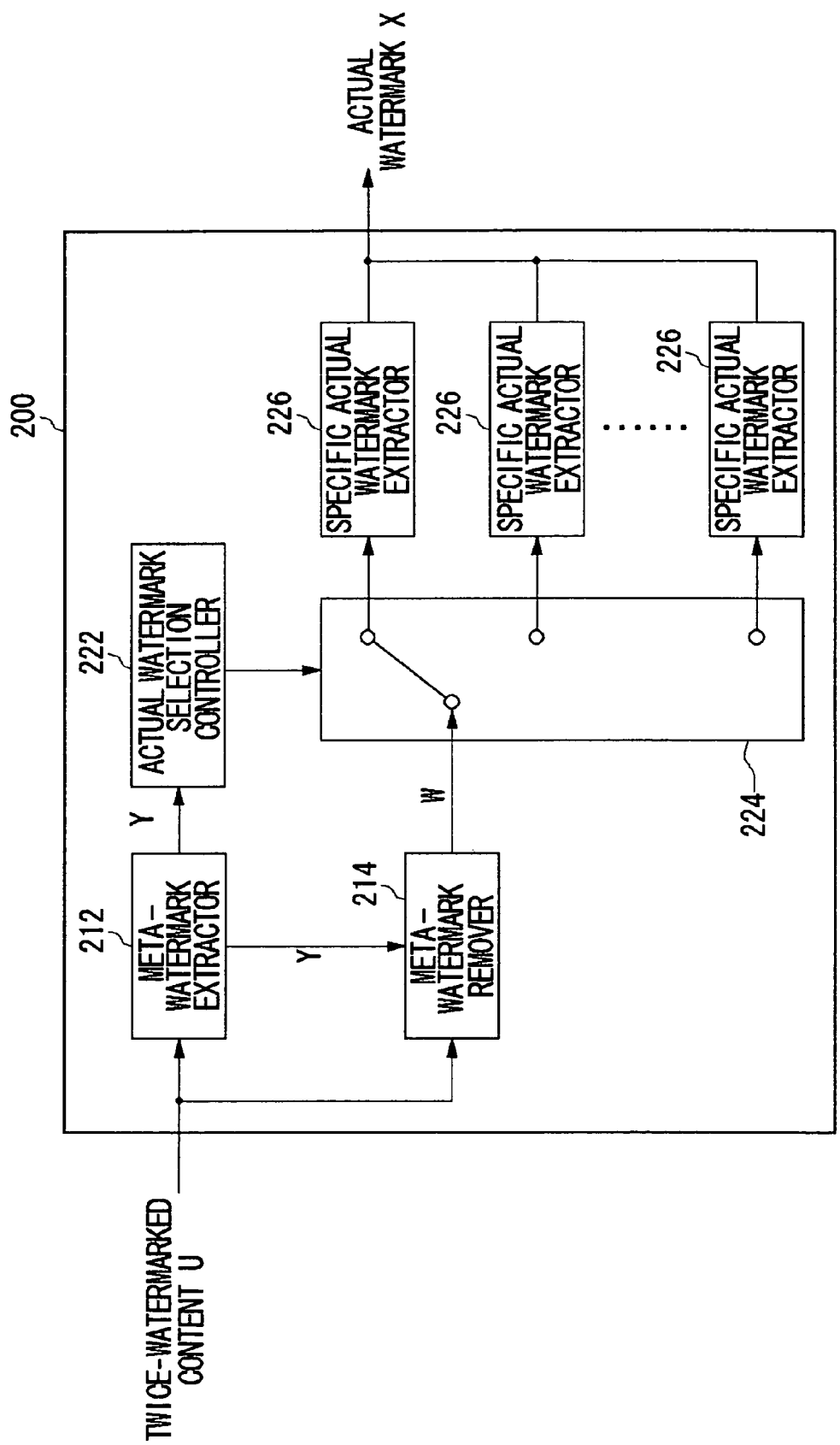
FIG. 2 shows a structure of a digital watermark extracting apparatus according to Embodiment 1.

FIG. 2 shows a structure of a digital watermark extracting apparatus 200 according to Embodiment 1. A meta-watermark extractor 212 extracts the meta-watermark Y from the input twice-watermarked content U and provides it to an actual watermark selection controller 222 and a meta-watermark remover 214. The meta-watermark remover 214 removes the meta-watermark Y, which has been extracted by the meta-watermark extractor 212, from the twice-watermarked content U and thereby obtains the actual-watermarked content W and then provides it to a switch 224. Since the meta-watermark Y has been embedded by the reversible watermarking method, the mete-watermark remover 214 can restore the twice-watermarked content U to the state before the meta-watermark Y is embedded, that is, the actual-watermarked content W.

The actual watermark selection controller 222 identifies the watermarking method of the actual watermark X by referring to the meta-watermark Y extracted by the meta-watermark extractor 212, and gives the information on the identified watermarking method to the switch 224. Referring to the identification information on the watermarking method given by the actual watermark selection controller 222, the switch 224 selects one of specific actual watermark extractors 226, each of which is prepared for each of specific watermarking methods, corresponding to the identified specific watermarking method. Then, the switch 224 switches so as to provide the actual-watermarked content W given by the meta-watermark remover 214 to the selected specific actual watermark extractor 226.

The specific actual watermark extractor 226 has a function for extracting the watermark according to the specific watermarking method and extracts the actual watermark X from the actual-watermarked content W, which is given by the meta-watermark remover 214, by the specific watermarking method, and then outputs the actual watermark X.

According to the present embodiment, since the digital watermark extracting apparatus 200 extracts the actual watermark X after the meta-watermark remover 214 removes the meta-watermark Y, the degradation of the detection accuracy caused by the interference between the actual watermark X and the meta-watermark Y can be reduced.

The digital watermark extracting apparatus 200 of the present embodiment may be provided on a server or the like which offers contents, for instance, and may be utilized to offer to users the contents in which the watermarks are embedded by various watermarking methods. In receiving a request for a content from a user, the digital watermark extracting apparatus 200 extracts a meta-watermark from the content to identify the watermarking method applied to the content and extracts the actual watermark according to the identified method. Then the digital watermark extracting apparatus 200 can check the use condition of the content included in the actual watermark and determine to permit the user to use the content.

Embodiment 2

Figure 3:
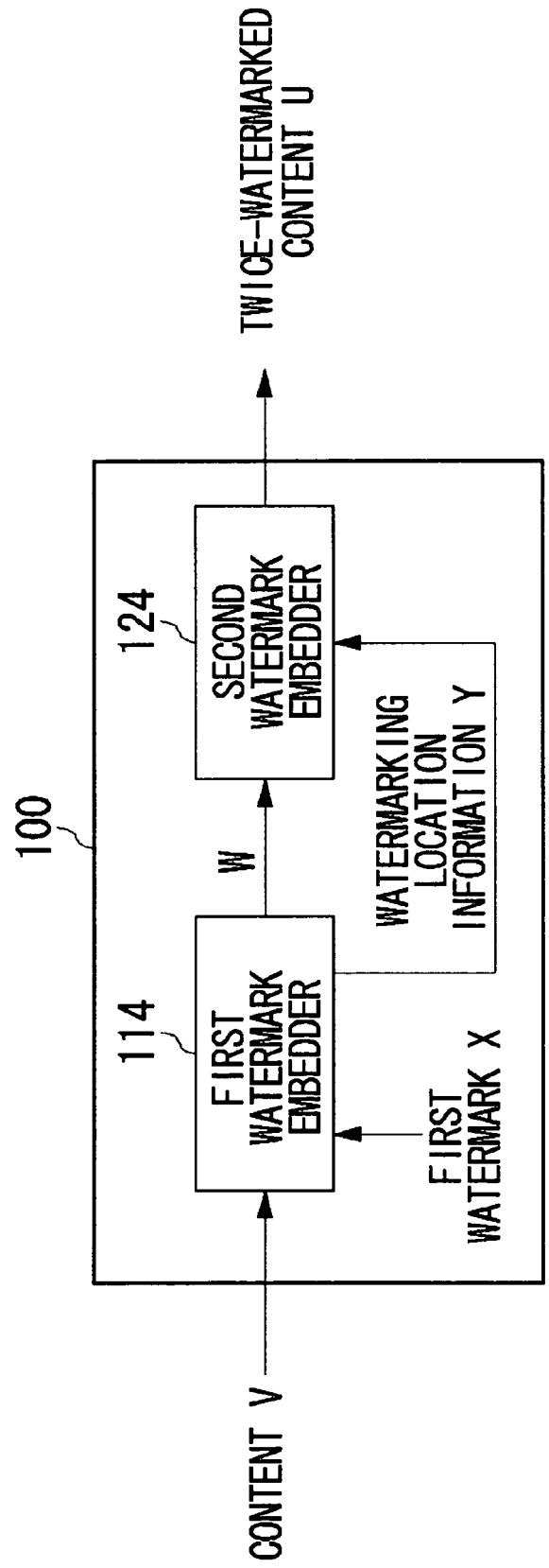
FIG. 3 shows a structure of a digital watermark embedding apparatus according to Embodiment 2.

FIG. 3 shows a structure of a digital watermark embedding apparatus 100 according to Embodiment 2. The first watermark embedder 114 embeds the first watermark X into an input content V and then outputs the first watermarked content W, and provides the watermarking location information Y on the first watermark X to the second watermark embedder 124.

The first watermark embedder 114 determines the watermarking location of the first watermark X according to the characteristics of the content V. For instance, if the content V is image data, the first watermark embedder 114 selects a location in which the watermark can be embedded unnoticeably by evaluating the distribution of the pixel values, selects the high frequency components of the image, for instance, an edge of the image, as a watermarking location, or selects a watermarking location in consideration of the robustness against the image processing such as image compression or the like. Thus the first watermark embedder 114 determines the watermarking location in consideration of the invisibility and the robustness. Therefore the watermarking location differs depending on the content V.

The second watermark embedder 124 embeds the watermarking location information Y (hereinafter also called the second watermark Y) provided by the first watermark embedder 114 into the first watermarked content W and outputs the twice-watermarked content U in which the first watermark X and the second watermark Y are embedded. It is to be noted that the second watermark embedder 124 embeds the second watermark Y into the first watermarked content W by a reversible watermarking method.

Figure 4:
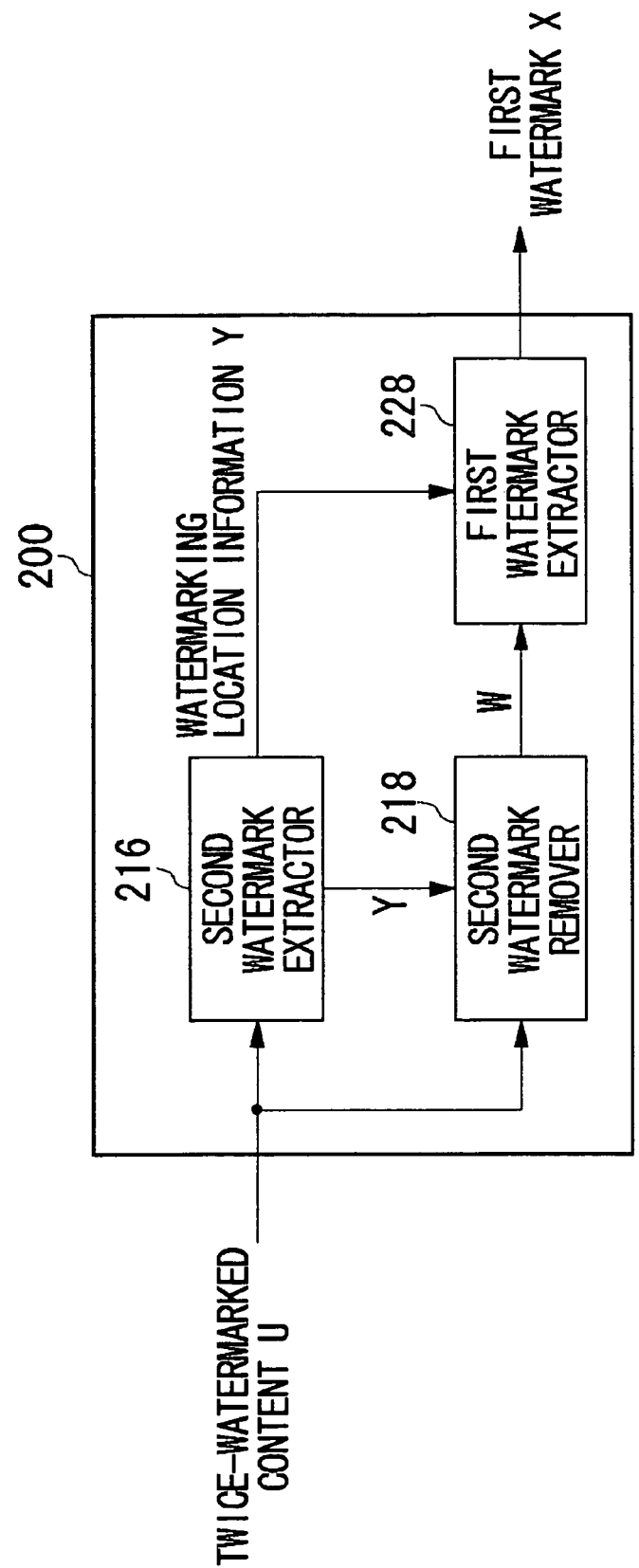
FIG. 4 shows a structure of a digital watermark extracting apparatus according to Embodiment 2.

FIG. 4 shows a structure of a digital watermark extracting apparatus 200 according to Embodiment 2. The second watermark extractor 216 extracts the second watermark Y, that is, the watermarking location information, from the input twice-watermarked content U and provides it to the first watermark extractor 228 and the second watermark remover 218. By performing the inverse transform of the watermarking process, the second watermark remover 218 removes the second watermark Y from the twice-watermarked content U and thereby obtains the first watermarked content W and provides it to the first watermark extractor 228.

The first watermark extractor 228 identifies the watermarking location according to the watermarking location information Y extracted by the second watermark extractor 216, and thereby extracts the first watermark X from the first watermarked content W and outputs it.

According to the present embodiment, since the watermarking location is embedded in the content as the second watermark, the process becomes unnecessary for notifying a user of the watermarking location, such that the watermarking location of the watermark is offered as a secret key or the watermarking location is included in the header of the content to be offered.

Embodiment 3

Figure 5:
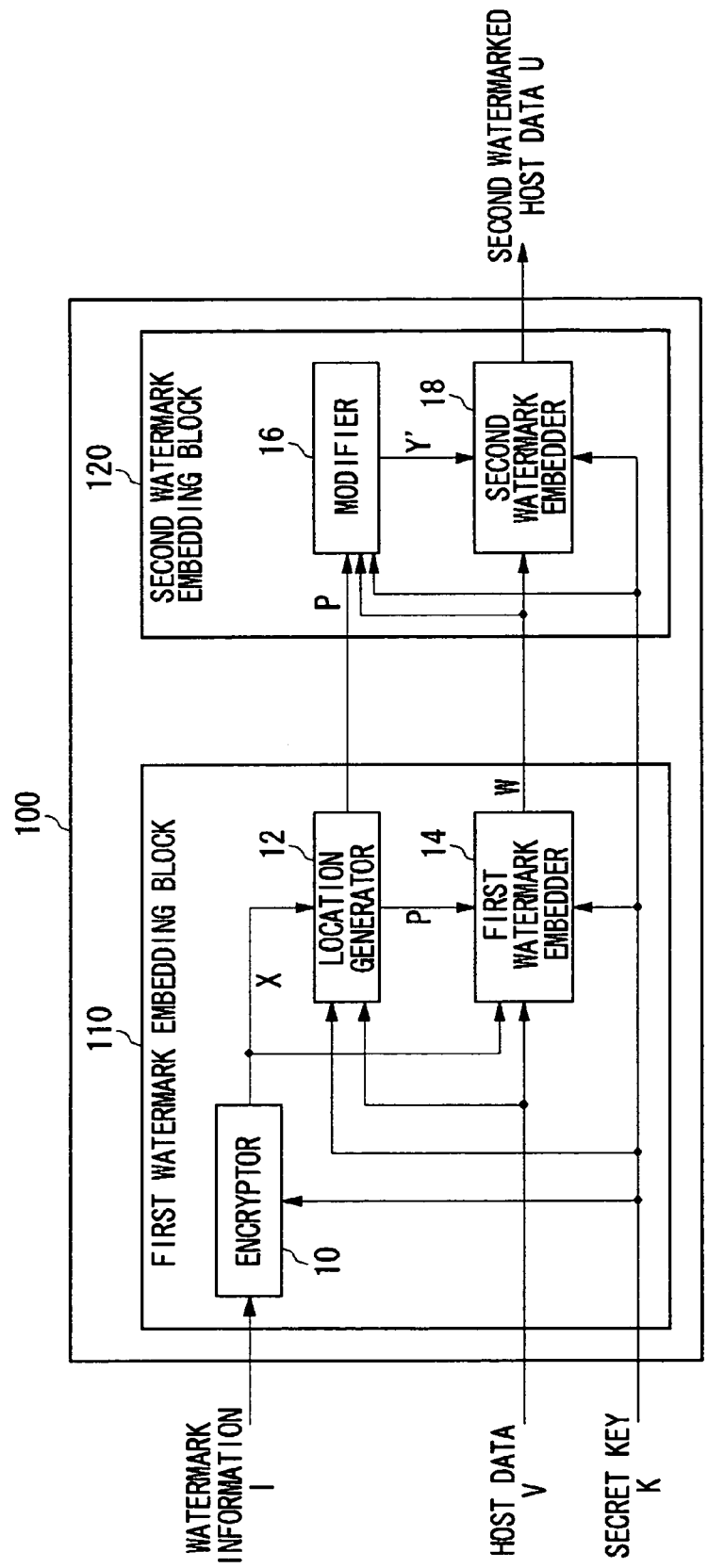
FIG. 5 shows a structure of a digital watermark embedding apparatus according to Embodiment 3.

FIG. 5 shows a structure of a digital watermark embedding apparatus 100 according to Embodiment 3. This structure can be realized by hardware, such as a CPU in arbitrary computers, memory and other LSIs, or by software, such as a program or the like loaded in the memory, which has functions for embedding digital watermarks. In the figure, functions, which are realized by combinations of such hardware and software, are shown by blocks. It should be understood by those skilled in the art that these functional blocks can be realized by various modes such as hardware only, software only or a combination thereof.

The digital watermark embedding apparatus 100 includes the first watermark embedding block 110 and the second watermark embedding block 120. The first watermark embedding block 110 performs a process for embedding watermark information I into host data V and outputs the first watermarked host data W. The second watermark embedding block 120 performs a process for embedding information related to the watermark location P of the watermark information into the first watermarked host data W as the second watermark, and outputs the second watermarked host data U.

The host data V are, for instance, media data such as audio, still image, video or the like. The watermark information I, for instance, includes copyright information such as identification, creator, or user information on the host data V, authentication information for detecting attacks on the host data V, timestamp information, and so forth.

The first watermark embedding block 110 embeds the first watermark X into a plurality of location candidates of the host data V and selects one of the candidates with a high level of robustness of the watermark, and finally outputs it as the first watermarked host data W. An encryptor 10 encrypts the watermark information I to be embedded in the host data V using a secret key K and outputs the first watermark X. If the watermark information I does not need to be encrypted, the configuration of the encryptor 10 may be omitted.

A location generator 12 determines a watermark location P of the first watermark X according to the characteristics of the host data V and the secret key K, and the first watermark embedder 14 embeds the first watermark X in the watermark location P of the host data V using the secret key K and outputs the first watermarked host data W. Although the same secret key K is input into the encryptor 10, the location generator 12, the first watermark embedder 14, the modifier 16 and the second watermark embedder 18 of the second embedding block 120 in FIG. 5, the secret key information input into each component may be independent of each other. A part of the secret key information may be dependent or the secret key information may be identical. An embedding method independent of the secret key K may be adopted. The location generator 12 and the first watermark embedder 14, in cooperation with each other, generate a plurality of the watermark locations P, and embed the first watermark X in the respective watermark locations P, and thereby generate a plurality of candidates for the first watermarked host data W and select one of the candidates under the criteria of the higher robustness and smaller watermark visibleness.

The second watermark embedding block 120 scrambles the second watermark Y which contains the identification information on the watermark location P of the first watermark X and embeds it into the first watermarked host data W, and then outputs the second watermarked host data U.

The modifier 16 modulates the second watermark Y using the second watermark Y, the first watermarked host data W, and the secret key K and outputs the modulated second watermark Y'.

The second watermark embedder 18 embeds the modulated second watermark Y' into the first watermarked host data W using the secret key K and outputs the second watermarked host data U. An embedding method independent of the secret key K may be adopted.

The modifier 16 and the second watermark embedder 18, in cooperation with each other, generate a plurality of the scrambled watermarks Y' and embed each of them in the first watermarked host data W, and thereby generate a plurality of candidates for the second watermarked host data U and select one of the candidates under the criteria of the higher robustness and smaller watermark visibleness.

Figure 6:
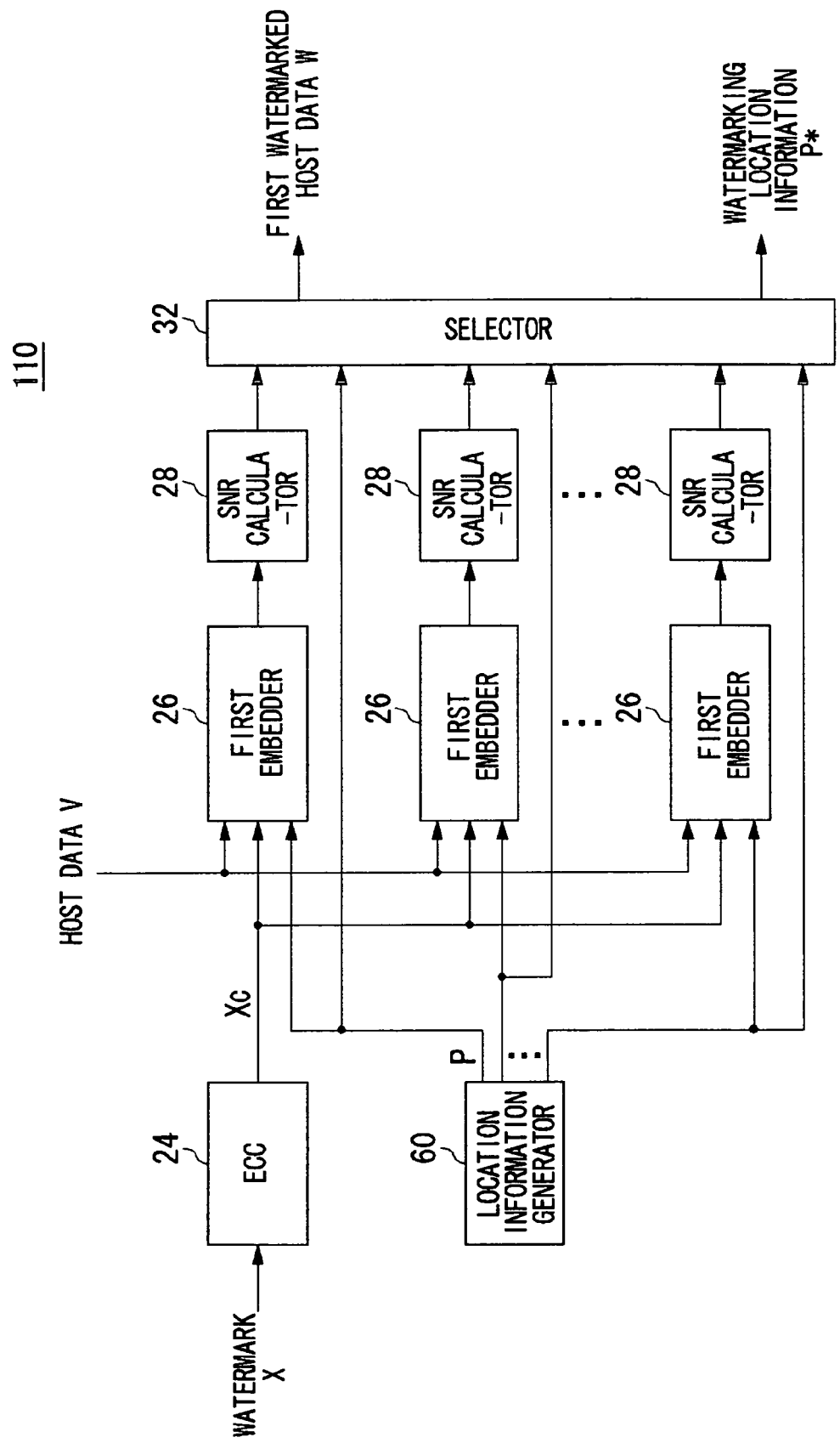
FIG. 6 is a block diagram of the first watermark embedding block of FIG. 5.

FIG. 6 is a block diagram of the location generator 12 and the first watermark embedder 14. An error correction coder (ECC) 24 generates a watermark $X_c$ with a parity for error correction added to the first watermark X. The ECC 24 is an option for improving the detection rate of the watermark bits and therefore this configuration may be omitted depending on applications.

The location information generator 60 randomly generates $L_1$ candidate watermark locations P of the host data V. The first embedder 26 embeds the watermark $X_c$ into each of the $L_1$ candidate watermark locations P and generates $L_1$ kinds of candidates for the first watermarked host data W.

$L_1$ SNR calculators 28 each evaluate the robustness of the first watermark X hidden in the $L_1$ kinds of candidates for the first watermarked host data W. A selector 32 selects one of the candidates for the first watermarked host data W for which the evaluation of the robustness is the best, and outputs it as the final first watermarked host data W and also outputs the watermark location information P* of the first watermark X embedded therein.

The candidate watermark locations may be randomly generated by a look-up table. The location information generator 60 has a table that associates information for identifying the candidate watermark locations with the actual watermark locations and generates the candidate watermark locations corresponding to its identification data by referring to the table. In other words, the table stores a correspondence relation between identification numbers and coordinates of the watermark locations, for instance, a location (1, 19) for an identification number 0, a location (983,251) for an identification number 1, . . . , and a location (542,37) for an identification number 15, for the first bit of the watermark. For each of the second to the $n_1$-th bits, a different correspondence relation which defines different watermark locations is stored. The coordinates of the watermark locations may be randomly generated by some other method.

Figure 7:
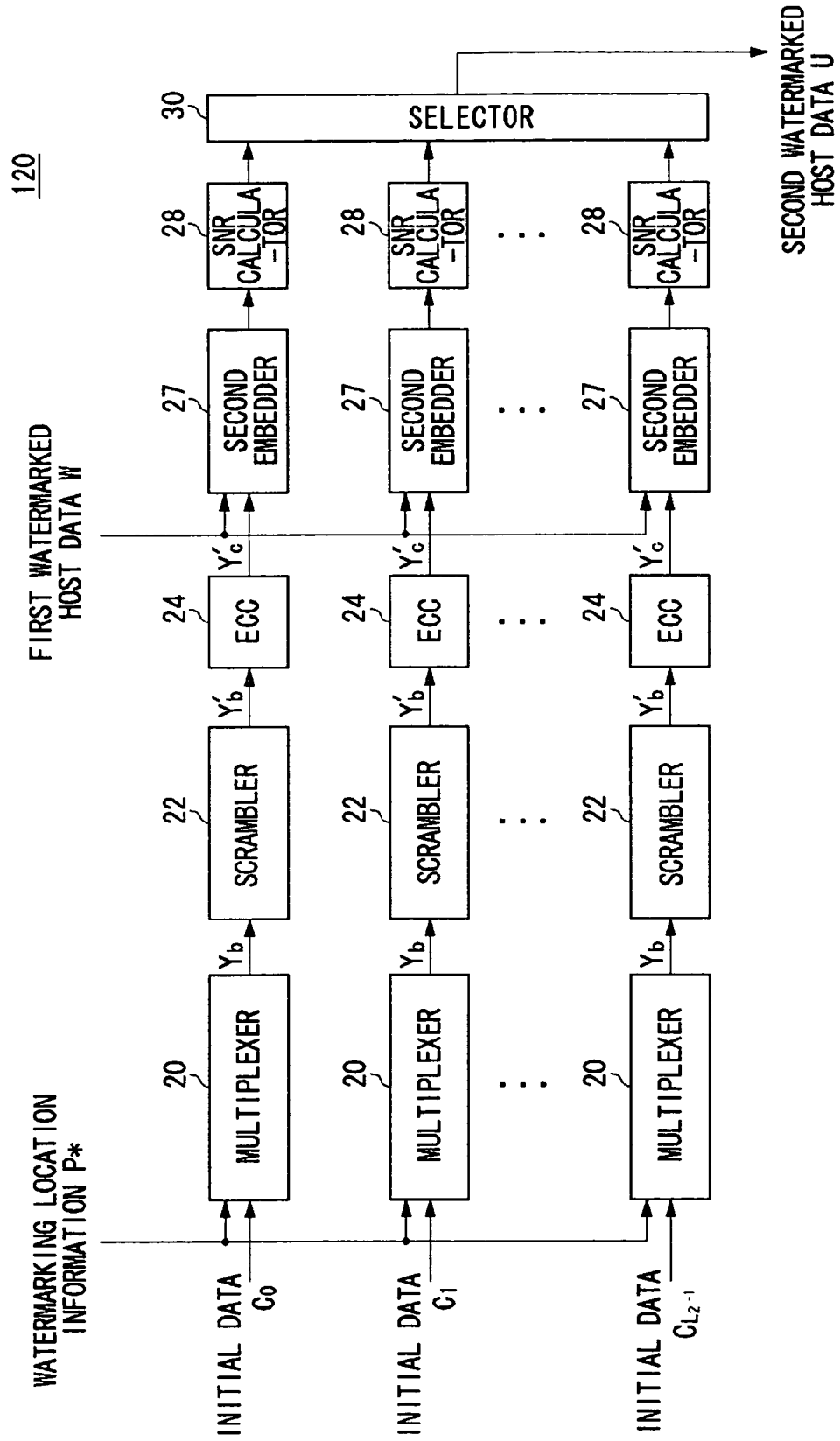
FIG. 7 is a block diagram of the second watermark embedding block of FIG. 5.

FIG. 7 is a block diagram of the modifier 16 and the second watermark embedder 18 of the second watermark embedding block 120. The first watermark embedding block 110 provides the second watermark embedding block 120 with the first watermarked host data W and the watermark location information P*. The watermark location information P* is the identification information on the location where each bit of the first watermark X has been embedded and the bit sequence which contains this identification information is denoted by the second watermark Y. $L_2$ multiplexers 20 generate $L_2$ kinds of bit sequences $Y_b$ by adding initial data $C_0$ to $C_{L2-1}$ to the head of the second watermark Y. $L_2$ scramblers 22 scramble the $L_2$ kinds of bit sequences respectively and generate $L_2$ kinds of scrambled watermark $Y_b'$. $L_2$ ECCs 24 generate the second watermarks $Y'_c$ by adding the parity bits for error correction to the respective scrambled watermarks $Y'_b$.

$L_2$ second embedders 27 embed the $L_2$ kinds of scrambled watermarks $Y'_c$ in the first watermarked host data W respectively and generate $L_2$ kinds of candidates for the second watermarked host data U. Each one of $L_2$ SNR calculators 28 evaluates the robustness of the watermark Y hidden in the each candidate for the second watermarked host data U. A selector 30 selects one of the candidates for the second watermarked host data U for which the evaluation of the robustness is the best, and outputs it as the final second watermarked host data U.

Figure 8:
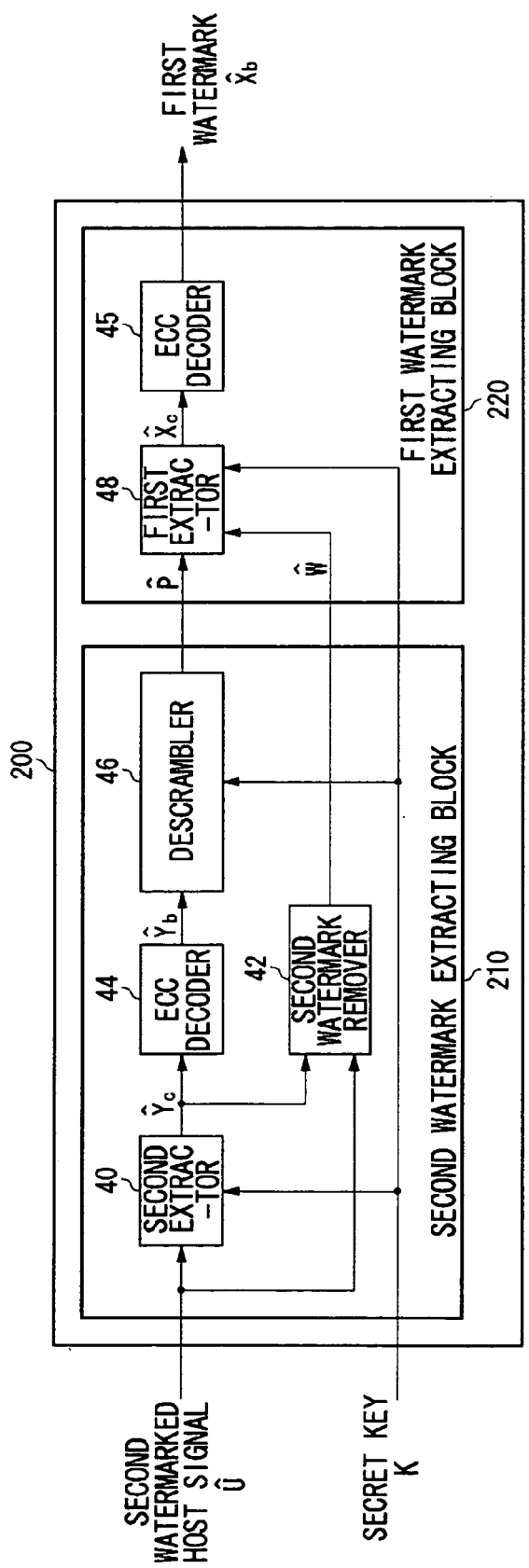
FIG. 8 shows a structure of a digital watermark extracting apparatus according to Embodiment 3.

FIG. 8 shows a structure of a digital watermark extracting apparatus 200 according to Embodiment 3. The second watermarked host data U in which a digital watermark has been embedded by the digital watermark embedding apparatus 100 is distributed via a network and utilized in a computer. During these processes, the second watermarked host data U are subject to operations such as compression and malicious attacks. In the case of image data, the data are subject to utility operations, for instance, signal processing such as JPEG compression, filtering, quantization, or color correction, or geometric transformation such as scaling, cropping, rotation, or translation, and also subject to illegal attacks such as removing or altering the digital watermark. Transformation by such operations adds a noise N to the second watermarked host data U and the second watermarked host data U with the noise N added is called the second watermarked host signal U^. The watermark extracting apparatus 200 performs a process for extracting the watermark X from the second watermarked host signal U^.

The digital watermark extracting apparatus 200 includes the second watermark extracting block 210 and the first watermark extracting block 220. The second watermark extracting block 210 performs a process for extracting the second watermark Y from the second watermarked host signal U^. The second extractor 40 extracts the second watermark $Y^{\wedge}_c$ from the second watermarked host signal U^ using the secret key K. An ECC decoder 44 corrects errors using the parity bits within the watermark $Y^{\wedge}_c$ and thereby generates the second watermark $Y^{\wedge}_b$. A descrambler 46 descrambles the error-corrected second watermark $Y^{\wedge}_b$ using the secret key K and removes the initial data at the head of the unscrambled second watermark and thereby outputs the second watermark Y^. The second watermark Y^ contains the watermark location information P^ on the first watermark X and this watermark location information P^ is provided to the first extractor 48 of the first watermark extracting unit 220.

The second watermark remover 42 of the second watermark extracting block 210 removes the second watermark $Y^{\wedge}_c$, which has been extracted by the second extractor 40, from the second watermarked host signal U^ by performing the inverse transform of the watermarking process employed by the second embedder 27 of the second watermark embedding block 120 of FIG. 7, and then outputs the first watermarked host signal W^.

The first watermark extracting block 220 performs a process for extracting the first watermark X from the first watermarked host signal W^ which is provided by the second watermark remover 42 of the second watermark extracting block 210. The first extractor 48 translates the second watermark Y^, which is output from the descrambler 46 of the second watermark extracting block 210, into the watermark location information P^, and extracts the first watermark $X^{\wedge}_c$, which has been embedded in the location indicated by the watermark location information P^, from the first watermarked host signal W^ given by the second watermark remover 42 of the second watermark extracting block 210, using the secret key K. An ECC decoder 45 corrects errors using the parity bits within the first watermark X^$_c$ and thereby generates the first watermark X^$_b$ and outputs it.

The first extractor 48 utilizes the above-mentioned method for referring to the look-up table, for instance. Namely, the first extractor 48 refers to the same table that the location information generator 60 of FIG. 6 refers to, and identifies the watermark location corresponding to the identification information on the watermark location, and then extracts the first watermark X^ form the identified location.

In the above explanation, $L_2$ multiplexers 20, scramblers 22, ECCs 24, second embedders 27, and SNR calculators 28 are provided in parallel to generate $L_2$ kinds of candidate watermarks, however, a single set of these components may be provided and $L_2$ kinds of candidate watermarks may be sequentially generated and evaluated, and thereby an optimal candidate may be selected. During the sequential generation of the candidate watermarks, once a candidate with a higher level of robustness than a desired level is obtained, the candidate can be selected as the final watermarked host data W. If such a candidate is not generated, from among $L_2$ kinds of candidates for the watermarked host data which are generated in the sequential computation, one candidate with the highest level of the robustness can be selected as the final watermarked host data W.

The procedures of embedding and extracting a watermark by the above-mentioned configuration of the digital watermark embedding apparatus 100 and the digital watermark extracting apparatus 200 are now explained.

(1) The Procedure of Embedding the First Watermark X

Figure 9:
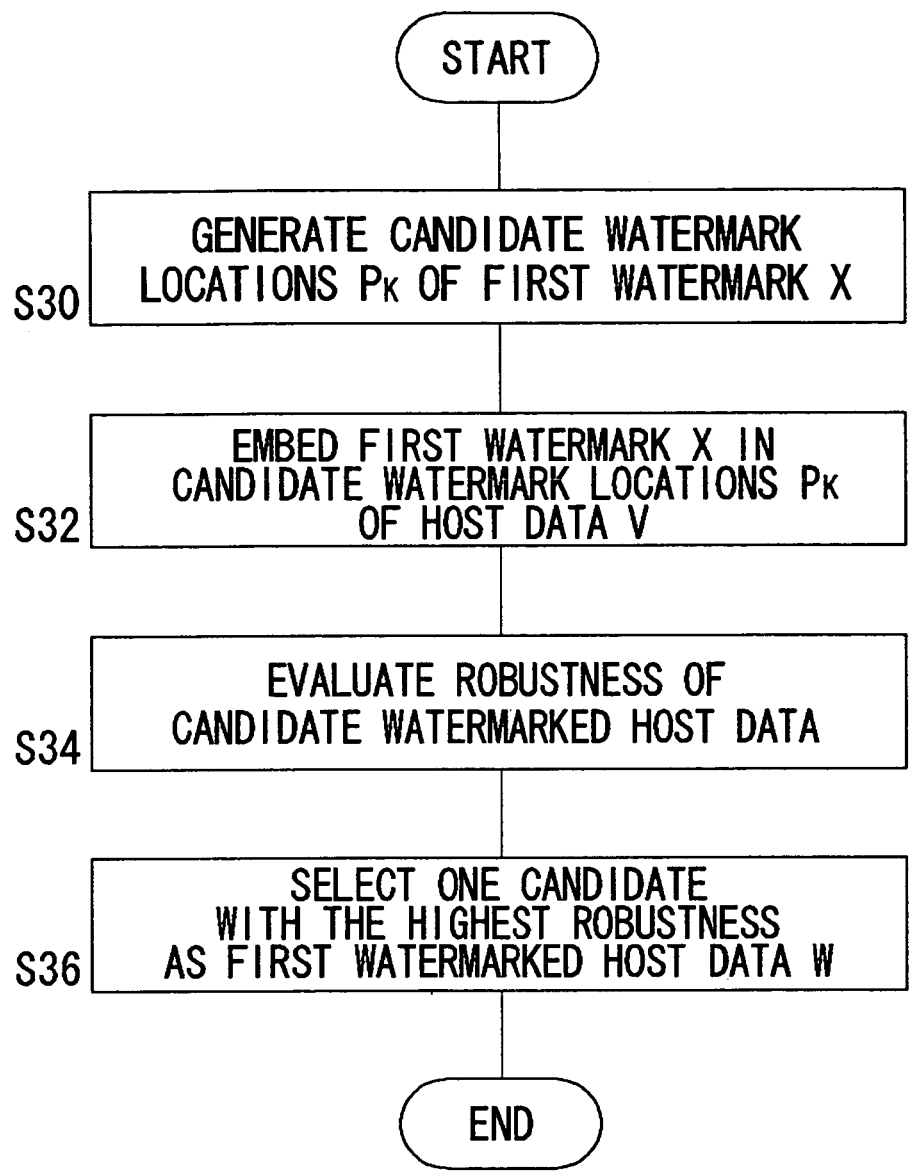
FIG. 9 is a flowchart showing the first watermark embedding procedure employed by the first watermark embedding block of FIG. 6.

FIG. 9 is a flowchart showing the procedure of embedding the first watermark X, which is employed by the first watermark embedding block 110 of the digital watermark embedding apparatus 100. The location information generator 60 generates $L_1$ candidate watermark locations $P_k$ (k=0, ..., $L_1$-1) of the first watermark X (S30).

The ECC 24 adds parity bits for error correction to the first watermark X and the first embedder 26 embeds the first watermark X in each of the $L_1$ candidate watermark locations $P_K$ of the host data V (S32).

The first watermark X is represented by the following bit sequence of n, bits:

$$X = \{x_0, x_1, \ldots, x_{n1-1}\}$$

A pair of sample sets ($V^{+k}$, $V^{k}$) is defined as follows. The samples which correspond to the candidate watermark location $P_k$ of the first watermark X of $n_1$ bits are selected from the host data V. The sample sets $V^{+k}$ and $V^{-k}$ each contain $n_1$ elements. It is to be noted that the host data V are represented by a set of samples over spatial domain, temporal domain, or frequency domain, for instance, the samples processed by Discrete Cosine Transform, Discrete Fourier Transform or Discrete Wavelet Transform. The sample sets $V^{+k}$ and $V^{-k}$ consist of $n_1$ subsets:

$$V^{+k} = \{v^{+k}_0, v^{+k}_1, \ldots, v^{+k}_{n1-1}\}$$

$$V^{-k} = \{v^{-k}_0, v^{-k}_1, \ldots, v^{-k}_{n1-1}\}$$

where each subset $v^{+k}_i$ and $v^{-k}_i$, an element of the sample sets $V^{+k}$ and $V^{-k}$, respectively, is composed of $m_1$ samples of the host data V:

$$v^{+k}_i = \{v^{+k}_{i,0}, v^{+k}_{i,1}, \ldots, v^{+k}_{i,m1-1}\}$$

$$v^{-k}_i = \{v^{-k}_{i,0}, v^{-k}_{i,1}, \ldots, v^{-k}_{i,m1-1}\}$$

Each bit of the first watermark X is embedded into the $L_1$ sample pair sets ($V^{+k}$, $V^{-k}$) corresponding to the candidate watermark location $P_k$ to generate $L_1$ kinds of the first watermarked host data candidates $W^k$ as follows;

$$w^{+k}_{i,j} = v^{+k}_{i,j} + \alpha^+_{i,j} x_i$$

$$w^{-k}_{i,j} = v^{-k}_{i,j} - \alpha^-_{i,j} x_i$$

where $\alpha^+_{i,j}$ and $\alpha^-_{i,j}$ are positive values to scale the watermark bit $x_i$ according to a human visual system so as not to recognize the perceptual noise. The valuse $\alpha^+_{i,j}$ and $\alpha^-_{i,j}$ may be positive values, using the secret key K, drawn from a certain probability distribution, for instance, a Gaussian distribution, a uniform distribution or the like. In this case, the robustness of the embedded watermark is degraded. However, the confidentiality of the embedded watermark is improved.

Thus, each bit $x_i$ of the first watermark is redundantly embedded into $m_1$ samples in each subsets $v^{+k}_i$ and $v^{-k}_i$. As the number $m_1$ indicating the degree of the redundancy becomes greater, the possibility that the watermark bits are lost becomes lower and the detection error rate becomes smaller, whereas the number of bits that can be embedded into the host data decreases. Since each sample value is changed using $\alpha^+_{i,j}$ and $\alpha^-_{i,j}$ so that visual degradation is not perceptible, in principle, the degradation of image quality will not be perceptible by human eyes even though the number $m_1$ of samples in which a watermark bit is embedded increases. That is, the increase in $m_1$ means the number of watermark bits which can be embedded decreases because of the limited region for watermarking, resulting in a decline in the watermark payload.

The SNR calculator 28 evaluates the robustness of the first watermark X for each of the $L_1$ kinds of the first watermarked host data candidates $W^k$ (S34), and the selector 32 finally selects one watermarked host data candidate $W^k$ that has the highest degree of robustness as the final first watermarked host data W (S36).

The robustness of the embedded watermark is evaluated by regarding the host data V as a distortion noise to a signal of the first watermark X and calculating the signal-to-noise ratio (SNR). The larger the SNR is, the greater the robustness is. The SNR is evaluated by the following formula for the pair of the first watermarked host data candidates ($W^{+k}$, $W^{-k}$), $$K = \mathrm{argmax}_k (P_k / \sigma_k^2)$$

$$P_k = \sum_{i=0}^{n1-1} \left| \sum_{j=0}^{m1-1} (w^{+k}_{i,j} - w^{-k}_{i,j}) \right|^2 / n_1$$

$$\sigma_k^2 = \sum_{i=0}^{n1-1} \left| \sum_{j=0}^{m1-1} (w^{+k}_{i,j} - w^{-k}_{i,j}) - P_k^{1/2} w_i \right|^2 / n_1,$$

then the optimal K-th candidate is selected, which has the largest SNR.

(2) The Procedure of Embedding the Second Watermark Y

Figure 13A:
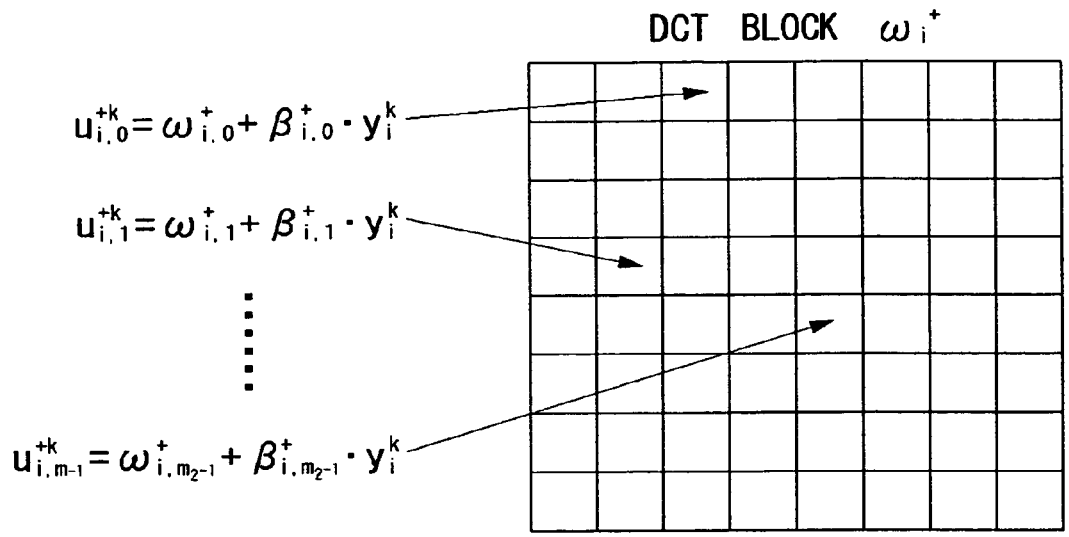
FIGS. 13A and 13B explain how a scrambled watermark is embedded.
Figure 13B:
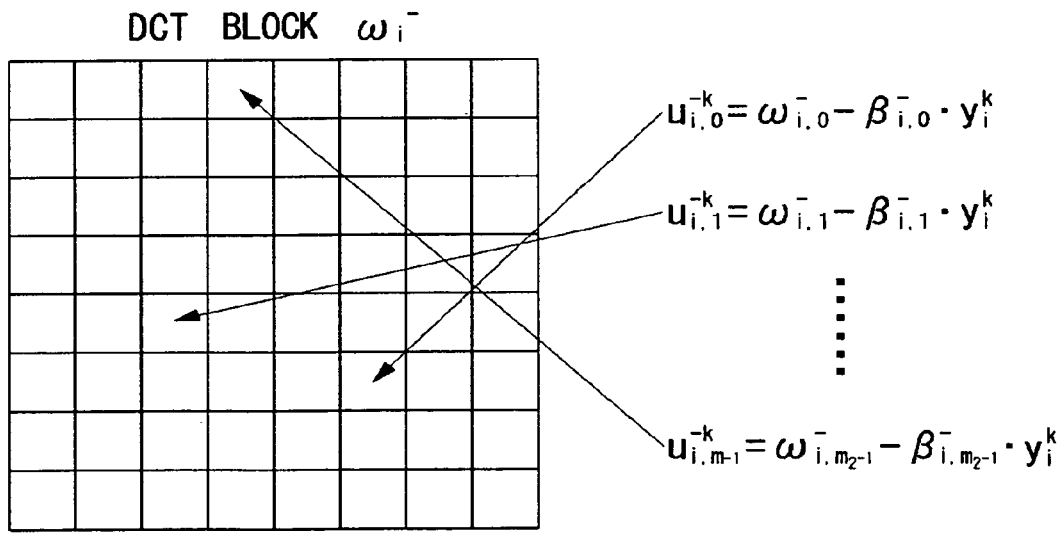
Figure 14:
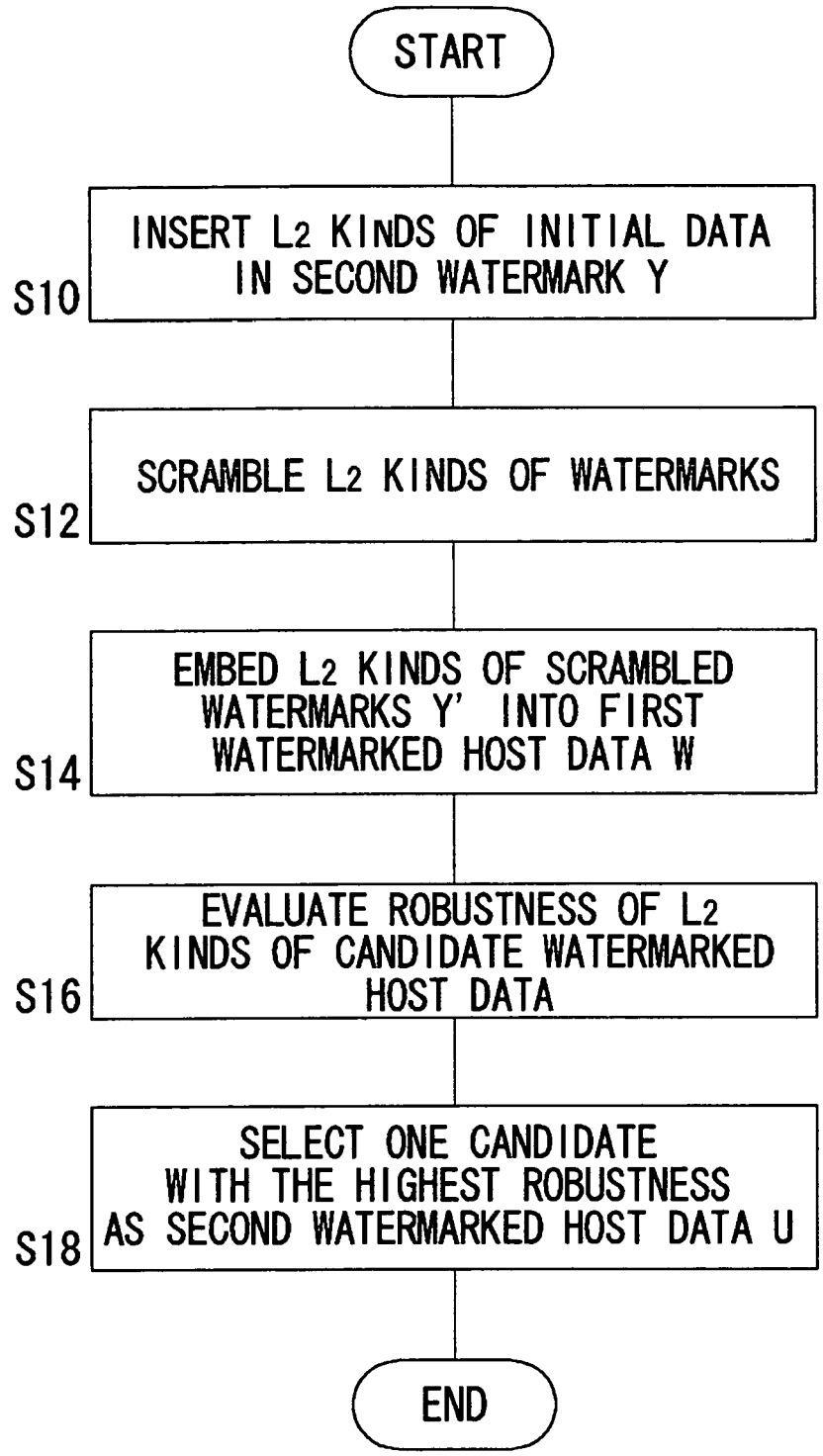
FIG. 14 is a flowchart showing the second watermark embedding procedure employed by the second watermark embedding block of FIG. 7.

FIG. 14 is a flowchart showing the procedure of embedding the second watermark Y, which is employed by the second watermark embedding block 120 of the digital watermark embedding apparatus 100. FIG. 10 to FIGS. 13A and 13B are referred to in the explanation of the flowchart.

The second watermark embedding block 120 is provided with the watermark location information P* of the first watermark X by the first watermark embedding block 110. The multiplexer 20 inserts $L_2$ kinds of initial data to the head of the second watermark Y which contains the watermark location information P* and thereby generates $L_2$ kinds of sequences (S10), and the scrambler 22 scrambles these sequences and thereby generates $L_2$ kinds of scrambledsecond watermarks Y' (S12).

Figure 10:
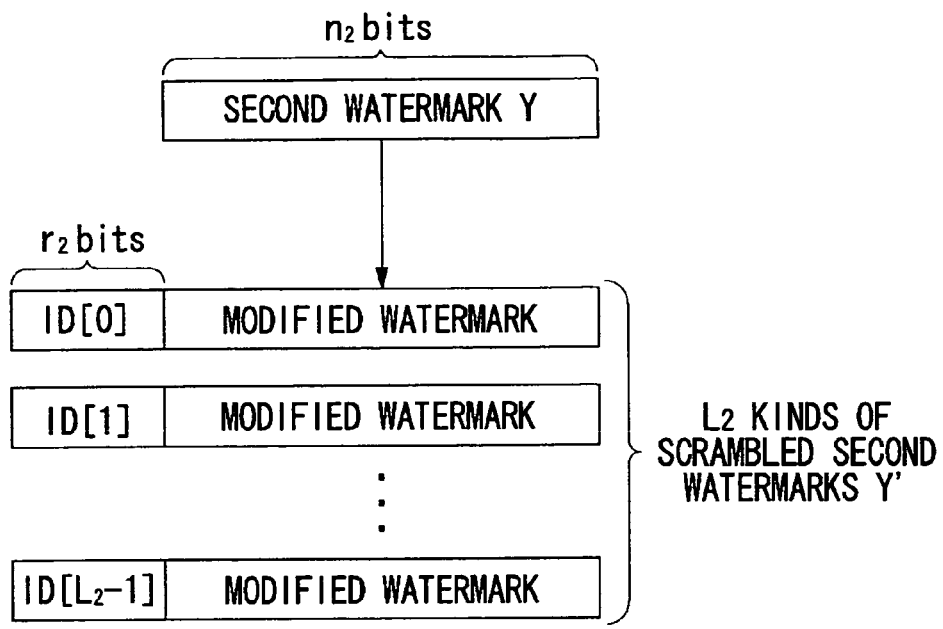
FIG. 10 shows a relationship between the second watermark and the scrambled second watermarks.

FIG. 10 shows a relationship between the second watermark Y and the $L_2$ kinds of scrambled second watermarks Y'. The identification data ID[i] of $r_2$-bit, i=0, . . . , $L_2$-1, which indicates how to map the second watermark Y into the modified watermarks, are inserted to the head of the $n_2$-bit second watermark Y and thus the $L_2$ kinds of candidates for the second watermark are generated. At most $2^{r_2}$ kinds of candidates are generated. The second watermark Y is scrambled by a scrambling method that is described below.

As one of the scrambling methods, a guided scrambling (GS) technique, usually used for digital modulation for data transmission and magnetic recording, is adopted. This guided scrambling method generates L kinds of encoded sequences from a data sequence of a definite block length, and treats the generated sequences as candidates for an encoded sequence to be transmitted next. The method selects one which is most suitable to the characteristics of the transmission medium and transmits the selected one as a final encoded sequence. By using a scrambling scheme in the GS technique, a variety of candidates for the encoded sequence can be easily generated.

The multiplexer 20 and the scrambler 22 of the second watermark embedding block 120 together function as a part of GS encoder. The GS encoder augments an n-bit source sequence D(x) with L kinds of r-bit redundant words $c_i$, i=0, . . . , L-1, to generate L augmented source sequence $c_i x^n + D(x)$. The length of the augmented sequence is n+r bits. Next, the augmented source sequences are divided by the scrambling polynomial S(x) of degree N to obtain quotients $T_i(x)$.

$$T_i(x) = Q_{S(x)}[(c_i x^n + D(x))x^N] \quad (1)$$

where $Q_a[b]$ represents the quotient of a polynomial b divided by a polynomial a. The quotient set $\{T_0(x), \ldots, T_{L-1}(X)\}$ is a set of candidate scrambled code sequences. For each candidate, the performance when the code sequence is really used is evaluated and the one for which the evaluation is the best is selected as the final code sequence.

In decoding, the descrambler 46 of the second watermark extracting block 210 functions as a GS decoder. The GS decoder multiplies the code sequence by S(x) and discards the lower n bits and upper r bits to obtain the original source sequence D(x).

The case in which the scrambling polynomial $S(x)=x^r+1$ is applied, is herein explained. When r is a positive number such that n mod r=0, the expression (1) can be represented by a convolutional operation as follows, $$t_j = d_j \oplus c_i (j=0)$$

$$t_j = d_j \oplus t_{j-1} (j=1, \ldots, n/r-1)$$

where i=0, . . . , L−1 and $d_j$ represents an r-bit word obtained from the original source sequence D(x) being segmented by every r bit, and $t_j$ represents an r-bit word obtained from the code sequence $T_i(x)$ being segmented by every r bit. The r-bit redundant word $c_i$ is at the head of $T_i(x)$. Herein $\oplus$ denotes an exclusive-OR operation.

Figure 11:
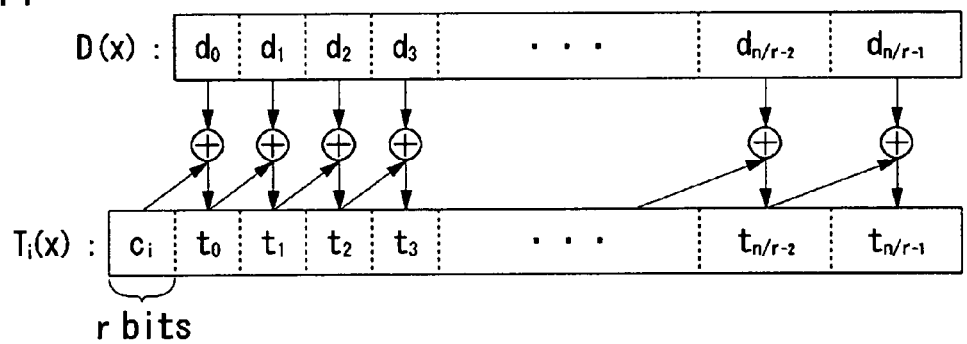
FIG. 11 explains a convolutional operation during an encoding process.

FIG. 11 explains the convolutional operation used in the GS encoding process. For instance, let n be 6 and r be 2. The redundant word $c_0=(0,0)$ is added to D(x)=(1,0,1,0,0,1) and then a code sequence $T_0(x)$ is generated. By the above-mentioned convolutional operation in the encoding, $t_0=d_0 \oplus c_0=(1,0) \oplus (0,0)=(1,0)$, $t_1=d_1 \oplus t_0=(1,0) \oplus (1,0)=(0,0)$, and $t_2=d_2 \oplus t_1=(0,1) \oplus (0,0)=(0,1)$, and thus the code sequence $T_0=(0,0,1,0,0,0,0,1)$ is obtained. It is to be noted that the head 2-bit data of the code sequence $T_0$ is the redundant word $c_0$.

Likewise, for the redundant word $c_1=(0,1)$, $c_2=(1,0)$, $C_3=(1,1)$, the code sequences $T_1=(0,1,1,1,0,1,0,0)$, $T_2=(1,0,0,0,1,0,1,1)$, and $T_3=(1,1,0,1,1,1,1,0)$ are obtained, respectively.

In decoding, the original source sequence D(x) is obtained by the following convolutional operation.

$$d_j = t_j \oplus c_i (j=0)$$

$$d_j = t_j \oplus t_{j-1} (j=1, \ldots, n/r-1)$$

Figure 12:
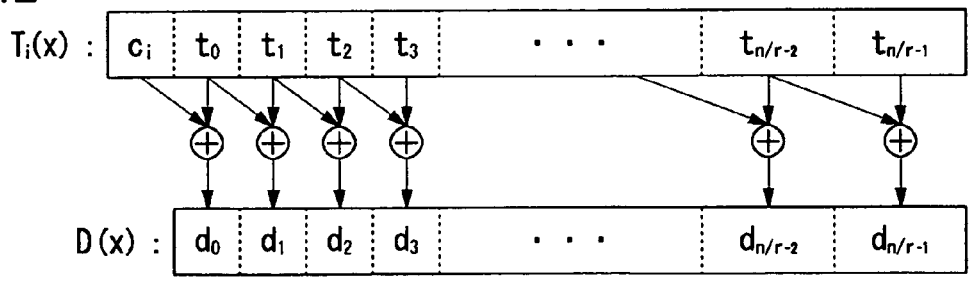
FIG. 12 explains a convolutional operation in a decoding process.

FIG. 12 explains the convolutional operation in the decoding process. When the code sequence $T_0=(0,0,1,0,0, 0,0,1)$ is given in the above-mentioned example, the redundant word $c_0=(0,0)$ is obtained from the head 2-bit data of the sequence. By the above-mentioned convolutional operation in the decoding, $d_0=t_0 \oplus c_0=(1,0) \oplus (0,0)=(1,0)$, $d_1=t_1 \oplus t_0=(0,0) \oplus (1,0)=(1,0)$, and $d_2=t_2 \oplus t_1=(0,1) \oplus (0,0)=(0, 1)$. For the other code sequences $T_1$, $T_2$ and $T_3$, the original source code D(x) is obtained likewise by this convolutional operation.

Referring to FIG. 14 again, the $L_2$ kinds of scrambled watermarks Y' generated by the scrambler 22 are augmented with parity bits by the ECC 24 and then embedded into the first watermarked host data W by the second embedder 27 (S14).

FIGS. 13A and 13B explain how the scrambled watermark Y' is embedded in the host data. Let $L_2$ kinds of scrambled watermark Y' be $y^0, y^1, \ldots, y^{L2-1}$. Each candidate watermark is represented as follows:

$$y^0 = \{-1, \cdots, -1, -1, y_0^0, y_1^0, \cdots, y_{n2-1}^0\}$$

$$y^1 = \{-1, \cdots, -1, 1, y_0^1, y_1^1, \cdots, y_{n2-1}^1\}$$

...

$$y^{L2-1} = \{1, \cdots, 1, 1, y_0^{L2-1}, y_1^{L2-1}, \cdots, y_{n2-1}^{L2-1}\}$$

The head $r_2$-bit data indicate the identification data. The bit "0" after the scrambling is replaced by "−1" and then the subsequent processes are conducted.

The sample sets $(\Omega^+, \Omega^-)$ in which an $(n_2+r_2)$-bit watermark Y is embedded are selected from the first watermarked host data W, using a secret key for embedding the second watermark, and the sets $(\Omega^+, \Omega^-)$ are independent of the sets $(v^+, V^-)$ selected as the target data in which the first watermark X is embedded according to the secret key for embedding the first watermark. Therefore, the sample sets are herein denoted by $(\Omega^+, \Omega^-)$ as distinguished from the sample sets (W+, W−) in which the first watermark has been embedded. The sample sets $\Omega^+$ and $\Omega^-$ each contain $(n_2+r_2)$ elements. It is to be noted that the first watermarked host data W are represented by a set of samples over spatial domain, temporal domain, or frequency domain, for instance, the samples processed by Discrete Cosine Transform, Discrete Fourier Transform or Discrete Wavelet Transform. A pair of sample sets ($\Omega^+$, $\Omega^-$) is defined as follows:

$$\Omega^+ = \{\omega^+_0, \omega^+_1, \ldots, \omega^+_{n2+r2-1}\}$$

$$\Omega^- = \{\omega^-_0, \omega^-_1, \ldots, \omega^-_{n2+r2-1}\}$$

where each subset $\omega^+_i$ and $\omega^-_i$, an element of the sample sets $\Omega^+$ and $\Omega^-$ respectively, is composed of $m_2$ samples of the first watermarked host data W, and is written as, $$\omega^+_i = \{\omega^+_{i,0}, \omega^+_{i,1}, \ldots, \omega^+_{i,m2-1}\}$$

$$\omega^-_i = \{\omega^-_{i,0}, \omega^-_{i,1}, \ldots, \omega^-_{i,m2-1}\}$$

The second watermark candidates $y^k$, k=0, ..., $L_2$-1, are embedded into the pair of the sample sets ($\Omega^+$, $\Omega^-$) to generate $L_2$ kinds of the second watermarked host data candidates $U^k$, as follows, $$u^{+k}_{i,j} = \omega^+_{i,j} + \beta^+_{i,j} y^k_i$$

$$u^{-k}_{i,j} = \omega^-_{i,j} - \beta^-_{i,j} y^k_i$$

where $\beta^+_{i,j}$ and $\beta^-_{i,j}$ are positive values to scale the watermark bit $y^k_i$ according to a human visual system so as not to recognize the perceptual noise. The values $\beta^+_{i,j}$ and $\beta^-_{i,j}$ may be positive values, using the secret key K, drawn from a certain probability distribution, for instance, a Gaussian distribution, a uniform distribution or the like. Thus, each bit $y^k_i$ of the k-th candidate of the second watermark is redundantly embedded into $m_2$ samples in each subset $\omega^+_i$ and $\omega^-_i$.

Each of the subsets $\omega^+_i$ and $\omega^-_i$ is, for example, a specific Discrete Cosine Transform (DCT) block and the $m_2$ samples in which the watermark bits are embedded are DCT coefficients in the DCT block. FIGS. 13A and 13B show how the second watermark bit $y^k_i$ is embedded into the $m_2$ DCT coefficients in a pair of DCT blocks $\omega^+_i$ and $\omega^-_i$ of 8×8 samples. The block pair $\omega^+_i$ and $\omega^-_i$ and the $m_2$ DCT coefficients are selected on the basis of the secret key K.

Referring to FIG. 14 again, the SNR calculator 28 evaluates the robustness of the second watermark $y^k$ for each of the $L_2$ kinds of the second watermarked host data candidates $U^k$ (S16), and the selector 30 selects one watermarked host data candidate $U^k$ that has the highest degree of robustness as the final second watermarked host data U (S18).

Before addressing a formula for evaluating its robustness, the manner in which the second watermark $Y\hat{}$ is to be extracted, is considered, when the second watermarked host data U are transformed by signal processing, image processing or the like. The distortion caused by the transformation of the second watermarked host data U is regarded as a noise N. The second watermarked host data U to which the noise N is added are called the second watermarked host signal $U\hat{}$. The method for extracting the second watermark $Y\hat{}$ from the second watermarked host signal $U\hat{}$ is now explained. A pair of the second watermarked host signal sets ($U\hat{}^+$, $U\hat{}^-$) is defined, where the sets $U\hat{}^+$ and $U\hat{}^-$ have $n_2+r_2$ elements respectively, as follows:

$$U\hat{}^+ = \{u\hat{}^+_0, u\hat{}^+_1, \ldots, u\hat{}^+_{n2+r2-1}\}$$

$$U\hat{}^- = \{u\hat{}^-_0, u\hat{}^-_1, \ldots, u\hat{}^-_{n2+r2-1}\}$$

where the subsets $u\hat{}^+_i$ and $u\hat{}^-_i$, each of which is the element of the second watermarked host signal $U\hat{}^+$ and $U\hat{}^-$ respectively, have the $m_2$ samples corresponding to the location in which the watermark is embedded. The subsets $u\hat{}^+_i$ and $u\hat{}^-_i$ are defined as:

$$u\hat{}^+_i = \{u\hat{}^+_{i,0}, u\hat{}^+_{i,1}, \ldots, u\hat{}^+_{i,m2-1}\}$$

$$u\hat{}^-_i = \{u\hat{}^-_{i,0}, u\hat{}^-_{i,1}, \ldots, u\hat{}^-_{i,m2-1}\}$$

The following detection value $z_i$ is calculated in order to determine the second watermark bit $y^k_i$.

$$z_i = \sum_{j=0}^{m2-1} (u\hat{}^+_{i,j} - u\hat{}^-_{i,j})$$

$$= \sum_{j=0}^{m2-1} [(u^+_{i,j} + n^+_{i,j}) - (u^-_{i,j} + n^-_{i,j})]$$

$$= \sum_{j=0}^{m2-1} [(\omega^+_{i,j} - \omega^-_{i,j}) + (\beta^+_{i,j} + \beta^-_{i,j})y^k_i + (n^+_{i,j} - n^-_{i,j})]$$

where $\Sigma_{j=0}^{m2-1}(\omega^+_{i,j} - \omega^-_{i,j})$ conforms to a Gaussian distribution and approaches zero when the number $m_2$ is large enough. Likewise, the noise term $\Sigma_{j=0}^{m2-1}(n^+_{i,j} - n^-_{i,j})$ also approaches zero. Therefore, the detection value $z_i$ can be approximated by the value $\Sigma_{j=0}^{m2-1}[(\beta^+_{i,j} + \beta^-_{i,j})y^k_i]$. Since $(\beta^+_{i,j} + \beta^-_{i,j})$ is positive by definition, $z_i$ is positive if the second watermark bit $y^k_i$ is 1, and $z_i$ is negative if the second watermark bit $y^k_i$ is -1. Therefore the value of the second watermark bit $y^k_i$ can be determined depending on whether $z_i$ is positive or negative.

The robustness of the embedded watermark is evaluated by regarding the first watermarked host data W as a distortion noise to a signal of the second watermark Y and calculating the SNR. The larger the SNR is, the greater the robustness is. The SNR is evaluated by the following formula for the pair of the second watermarked host data candidates ($U^{+k}$, $U^{-k}$), $$K = \mathrm{argmax}_k (P_k/\sigma_k^2)$$

$$P_k = \Sigma_{i=0}^{n2+r2-1} |\Sigma_{j=0}^{m2-1} (u^{+k}_{i,j} - u^{-k}_{i,j})|^2 / (n_2+r_2)$$

$$\sigma_k^2 = \Sigma_{i=0}^{n2+r2-1} |\Sigma_{j=0}^{m2-1} (u^{+k}_{i,j} - u^{-k}_{i,j}) - P_k^{1/2} y^k_i|^2 / (n_2+r_2),$$

then the optimal K-th candidate is selected, which has the largest SNR.

Since the above-mentioned detection value $z_i$ to determine whether the second watermark bit $y^k_i$ is 1 or -1 is given as $Z_i = \Sigma_{j=0}^{m2-1}(u^{+k}_{i,j} - u^{-k}_{i,j})$ before the noise is added to the second watermarked host data U, the variance $\sigma_k^2$ can be regarded as the mean square of the difference between the detection value $z_i$ on the second watermark bit and the actual embedded second watermark bit $y^k_i$ amplified by $P_k^{1/2}$ for i=0, ..., $n_2+r_2-1$. $P_k$ can be regarded as the mean square of the detection value $z_i$ for i=0, ..., $n_2+r_2-1$ and it indicates the average power of the embedded watermark. Therefore, the smaller the Euclidian distance between the embedded second watermark $y_k$ and the extracted watermark is and the larger the power of the detection value to determine the second watermark bit is, the larger $P_k/\sigma_k^2$ is. In other words, by selecting the candidate having the largest $P_k/\sigma_k^2$, the candidate having the smallest detection errors in extracting the second watermark bits can be selected.

In respect of the detection value $z_i$, if $\omega^+_{i,j} > \omega^-_{i,j}$ and $y^k_i = 1$, then $z_i \gg 0$, and if $\omega^+_{i,j} < \omega^-_{i,j}$ and $y^k_i = -1$, then $z_i \ll 0$. This means that by selecting the optimal second watermark candidate $y^k$ according to the above-mentioned evaluation, the original watermark bit $y_i$ is changed to $y_i'$ so that $y_i'=1$ if $\omega^+_{i,j}>\omega^-_{i,j}$ and $y_i'=-1$ if $\omega^+_{i,j}<\omega^-_{i,j}$ in order to improve the detection performance of the second watermark bit $y^k_i$. This is a guiding rule used in the GS-based method and thereby the response of the detection value $z_i$ is improved.

(3) The Procedure of Extracting the Second Watermark Y

When the second extractor 40 of the second watermark extracting block 210 receives the noisy second watermarked host signal U^, the second extractor 40 calculates the detection value $z_i$ as follows.

$$z_i = \sum_{j=0}^{m2-1} (u^{\wedge+}_{i,j} - u^{\wedge-}_{i,j})$$

$$= \sum_{j=0}^{m2-1} [(u^+_{i,j} + n^+_{i,j}) - (u^-_{i,j} + n^-_{i,j})]$$

$$\approx \sum_{j=0}^{m2-1} [(\omega^+_{i,j} - \omega^-_{i,j}) + (\beta^+_{i,j} + \beta^-_{i,j})y_i]$$

If the ECC decoder 44 is configured as a hard-input decoder, it is determined whether watermark bit $y^\wedge_i$ is $-1$ or 1, depending on whether the detection value $z_i$ is negative or positive, and thereby the second watermark $Y^\wedge_c$ is obtained. When the ECC decoder 44 is configured as a soft-input decoder, the detection value $z_i$ is directly sent to the ECC decoder 44 without making any hard decision on whether the detection value $z_i$ is $-1$ or 1.

Furthermore, the extracted second watermark $Y^\wedge_c$ is error corrected by the ECC decoder 44 and descrambled by the descrambler 46 and then output from the descrambler 46.

(4) The Procedure of Removing the Second Watermark

The procedure of removing the second watermark employed by the second watermark remover 42 of the second watermark extracting block 210 is now explained. The change caused by the second watermark Y^, which has been detected from the second watermarked host signal U^, is removed as follows to obtain the first watermarked host signal W^, $$\omega^{\wedge+}_{i,j} = u^{\wedge+}_{i,j} - \beta^{\wedge+}_{i,j} y^\wedge_i$$

$$= \omega^+_{i,j} + (\beta^+_{i,j} y_i - \beta^{\wedge+}_{i,j} y^\wedge_i) + n^+_i$$

$$= \omega^+_{i,j} + q^+_{i,j} + n^+_i$$

$$\omega^{\wedge-}_{i,j} = u^{\wedge-}_{i,j} - \beta^{\wedge-}_{i,j} y^\wedge_i$$

$$= \omega^-_{i,j} - (\beta^-_{i,j} y_i - \beta^{\wedge-}_{i,j} y^\wedge_i) + n^-_i$$

$$= \omega^-_{i,j} - q^-_{i,j} + n^-_i$$

where $\beta^{\wedge+}_{i,j}$ and $\beta^{\wedge-}_{i,j}$ are approximate values of the scaling valuses $\beta^+_{i,j}$ and $\beta^-_{i,j}$ according to a human visual system. If the scaling values on the second watermark are not based on the human visual system but they are calculated according to the secret key, the same values can be generated in embedding and extracting the second watermark and therefore $\beta^+_{i,j}=\beta^{\wedge+}_{i,j}$ and $\beta^-_{i,j}=\beta^{\wedge-}_{i,j}$. Furthermore, if the second watermark bit $y^\wedge_i$ is detected correctly or $y^\wedge_i=y_i$, then $q^+_{i,j}=q^-_{i,j}=0$ and the second watermark can be completely removed. When the human visual system is used, the target images for computing the scaling values are different in embedding and extracting, however, both images are so close that the difference cannot be recognized, resulting in $\beta^+_{i,j}\approx\beta^{\wedge+}_{i,j}$ and $\beta^-_{i,j}\approx\beta^{\wedge-}_{i,j}$. In conclusion, when the second watermark bit $y^\wedge_i$ is detected correctly or $y^\wedge_i=y_i$, the noise $q^+_{i,j}$ and $q^-_{i,j}$ caused by the removal of the second watermark approximates zero.

(5) The Procedure of Extracting the First Watermark

The procedure of extracting the first watermark employed by the first extractor 48 of the first watermark extracting block 220 is now explained. The first extractor 48 receives the first watermarked host signal W^, from which the second watermark Y^ has been removed, from the second watermark extracting block 210, and computes the following detection value $z_i$.

$$z_i = \sum_{j=0}^{m1-1} (w^{\wedge+}_{i,j} - w^{\wedge-}_{i,j})$$

$$= \sum_{j=0}^{m1-1} [(v^+_{i,j} - v^-_{i,j}) + (\alpha^+_{i,j} + \alpha^-_{i,j})x_i + (q\tilde{}^+_{i,j} + q\tilde{}^-_{i,j}) + (n\tilde{}^+_{i,j} - n\tilde{}^-_{i,j})]$$

where $q\tilde{}^\pm_{i,j}$ are noise caused after the removal of the second watermark bits embedded in the original host data $v^\pm_{i,j}$, and $n\tilde{}^\pm_{i,j}$ are noise added to the original host data $v^\pm_{i,j}$ by the signal processing or the like.

Herein $\Sigma_{j=0}^{m1-1}(v^+_{i,j}-v^-_{i,j})$ conforms to a Gaussian distribution and approaches zero when the number $m_1$ is large enough. Likewise, the noise term $\Sigma_{j=0}^{m1-1}(n^+_{i,j}-n^-_{i,j})$ also approaches zero. The term $\Sigma_{j=0}^{m1-1}(q\tilde{}^+_{i,j}+q\tilde{}^-_{i,j})$ can be approximated by zero, if the second watermark is extracted correctly. Therefore, the detection value $z_i$ can be approximated by the value $\Sigma_{j=0}^{m1-1}[(\alpha^+_{i,j}+\alpha^-_{i,j})x_i]$. Since $\alpha^+_{i,j}+\alpha^-_{i,j}$ is positive by definition, $z_i$ is positive if the first watermark bit $x_i$ is 1, and $z_i$ is negative if the first watermark bit $x_i$ is $-1$. Therefore the value of the first watermark bit $x_i$ can be determined depending on whether $z_i$ is positive or negative.

Finally, the detection value $z_i$ is approximated as follows.

$$z_i = \Sigma_{j=0}^{m1-1}(w^{\wedge+}_{i,j} - w^{\wedge-}_{i,j})$$

$$\approx \Sigma_{j=0}^{m1-1}[(v^+_{i,j}-v^-_{i,j})+(\alpha^+_{i,j}+\alpha^-_{i,j})x_i]$$

When the first extractor 48 of the first watermark extracting block 220 receives the first watermarked host signal W^, the first extractor 48 calculates the detection value $z_i$. If the ECC decoder 45 is configured as a hard-input decoder, it is determined whether the first watermark bit $x^\wedge_i$ is $-1$ or 1, depending on whether the detection value $z_i$ is negative or positive, and thereby the first watermark $X^\wedge_c$ is obtained. When the ECC decoder 45 is configured as a soft-input decoder, the detection value $z_i$ is directly sent to the ECC decoder 45 without making any hard decision on whether the detection value $z_i$ is $-1$ or 1.

Furthermore, the extracted first watermark $X^\wedge_c$ is error corrected by the ECC decoder 45 and output from the ECC decoder 45.

(6) The Acceptable Degradation Region of Watermark Vectors

Figure 15:
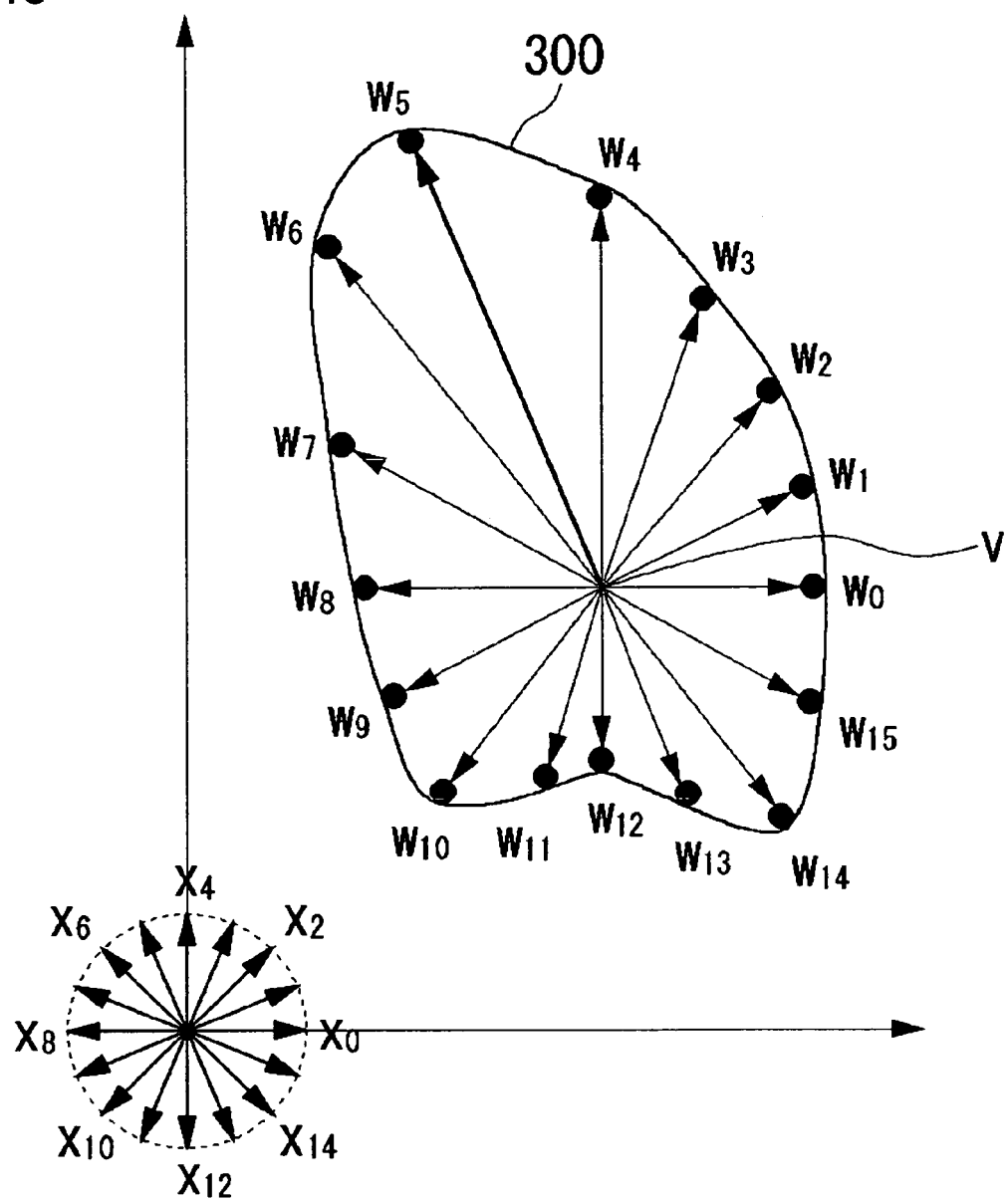
FIG. 15 is a conceptual diagram explaining a space defined by the first watermark vector candidates.

FIG. 15 depicts candidate watermark bit sequences for the host data V generated by the GS-based method. When the target host data v for embedding the watermark is represented by a point in the signal space of the host data, a non-linear region 300 in which no perceptual degradation occurs according to the human visual system is determined as shown in the figure. The region 300 is hereinafter called an acceptable degradation region. For the convenience of the explanation, the signal space is depicted in a two-dimensional space. If the number of the candidate watermark bit sequences is 16, the first watermark vector candidates $x_0$ to $x_{15}$ are obtained by scrambling. When these first watermark vector candidates $x_i$ (i=0, ..., 15) are added to the host data v, the candidates are multiplied by the scaling value $\alpha_i$ so that the watermarked host data candidates can be inside the acceptable degradation region 300. As a result, the first watermarked host data candidates $w_0$ to $w_{15}$ are obtained. Among these candidates, one candidate with the maximum SNR of the watermark, that is, the first watermarked host data $w_5$ of the maximum vector length as shown in the figure, is selected.

Figure 16:
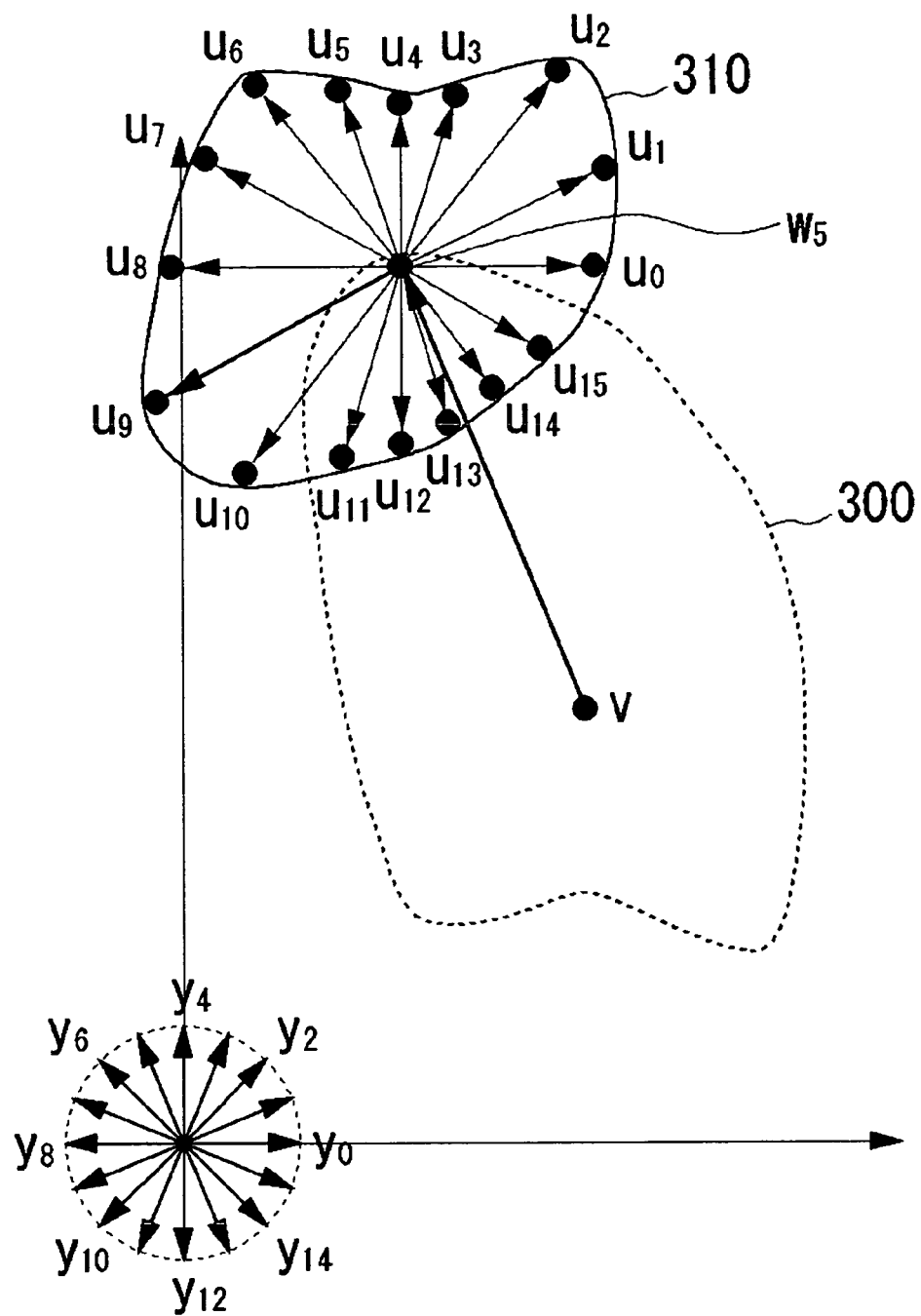
FIG. 16 is a conceptual diagram explaining a space defined by the second watermark vector candidates.

When the second watermark vector candidates $y_i$ (i=0, ..., 15) are generated by scrambling and embedded into the optimal first watermarked host data $w_5$ in the same way, as shown in FIG. 16, the second watermarked host data candidates $u_0$ to $u_{15}$ are obtained inside the acceptable degradation region 310 determined for the optimal first watermarked host data $w_5$. Among these candidates, one candidate with the maximum SNR of the watermark, that is, the optimal second watermarked host data $u_9$ as shown in the figure, is selected.

Figure 17:
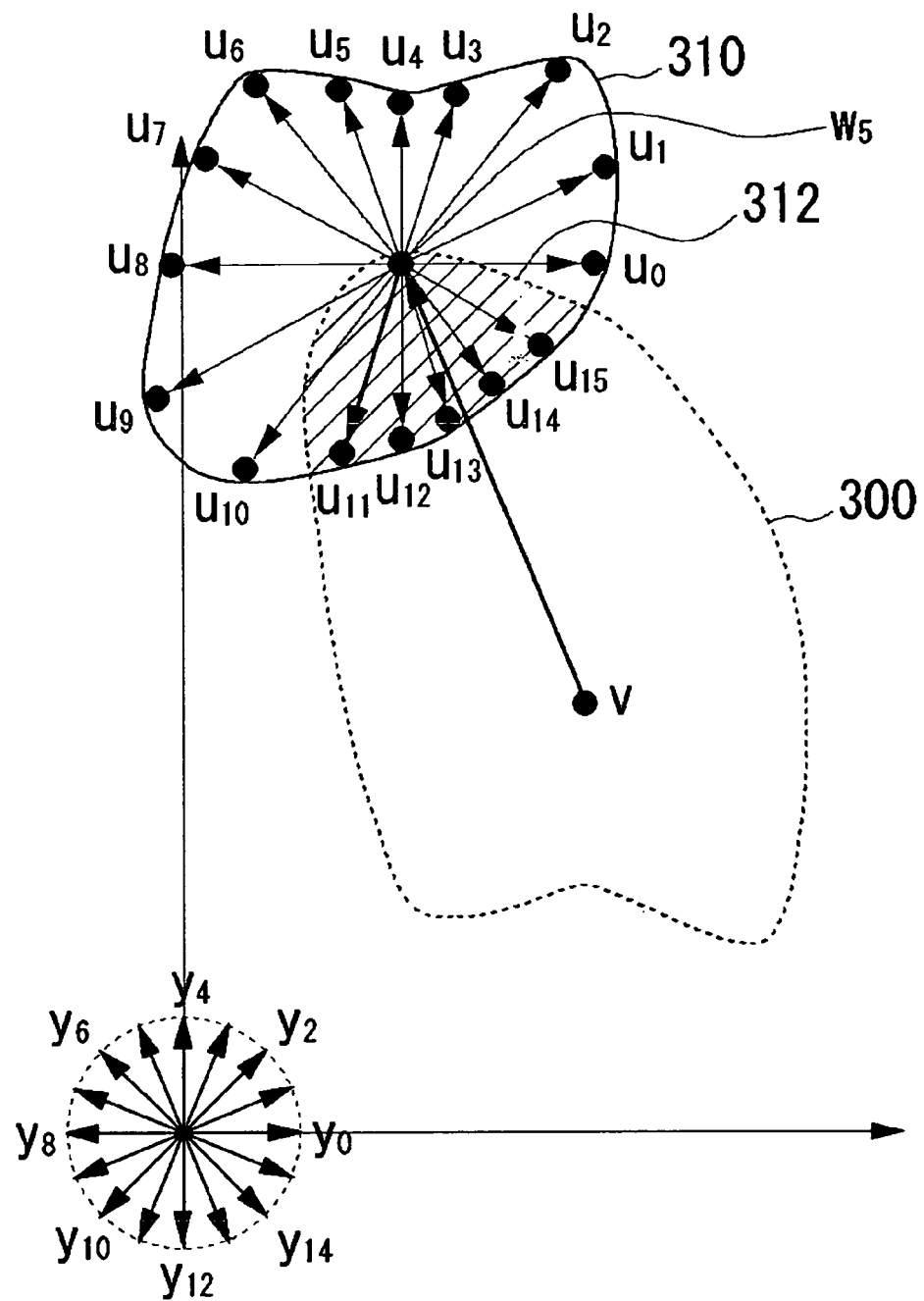
FIG. 17 explains an optimal selection example of the second watermark vector candidates.

Herein the optimal second watermarked host data $u_9$ is outside the acceptable degradation region 300 of the original host data v. When multiple watermarks are embedded, the multi-watermarked host data generally goes out of the acceptable degradation region of the original host data. Therefore, as shown in FIG. 17, the second watermarked host data candidates are selected so as to be inside the intersection region 312 of the acceptable degradation region 300 for the host data v and the acceptable degradation region 310 determined for the optimal first watermarked host data $w_5$ in which the first watermark has been embedded. In FIG. 17, among the second watermarked host data candidates $u_{11}$ to $u_{15}$ that are inside the intersection region 312, the optimal second watermarked host data $u_{11}$ with the maximum SNR of the watermark is obtained and thereby doubly watermarked host data can be inside the acceptable degradation region 300 for the original host data V. If more than two watermarks are embedded under the same condition, the multi-watermarked host data can be inside the acceptable degradation region 300 for the original host data v.

Figure 18:
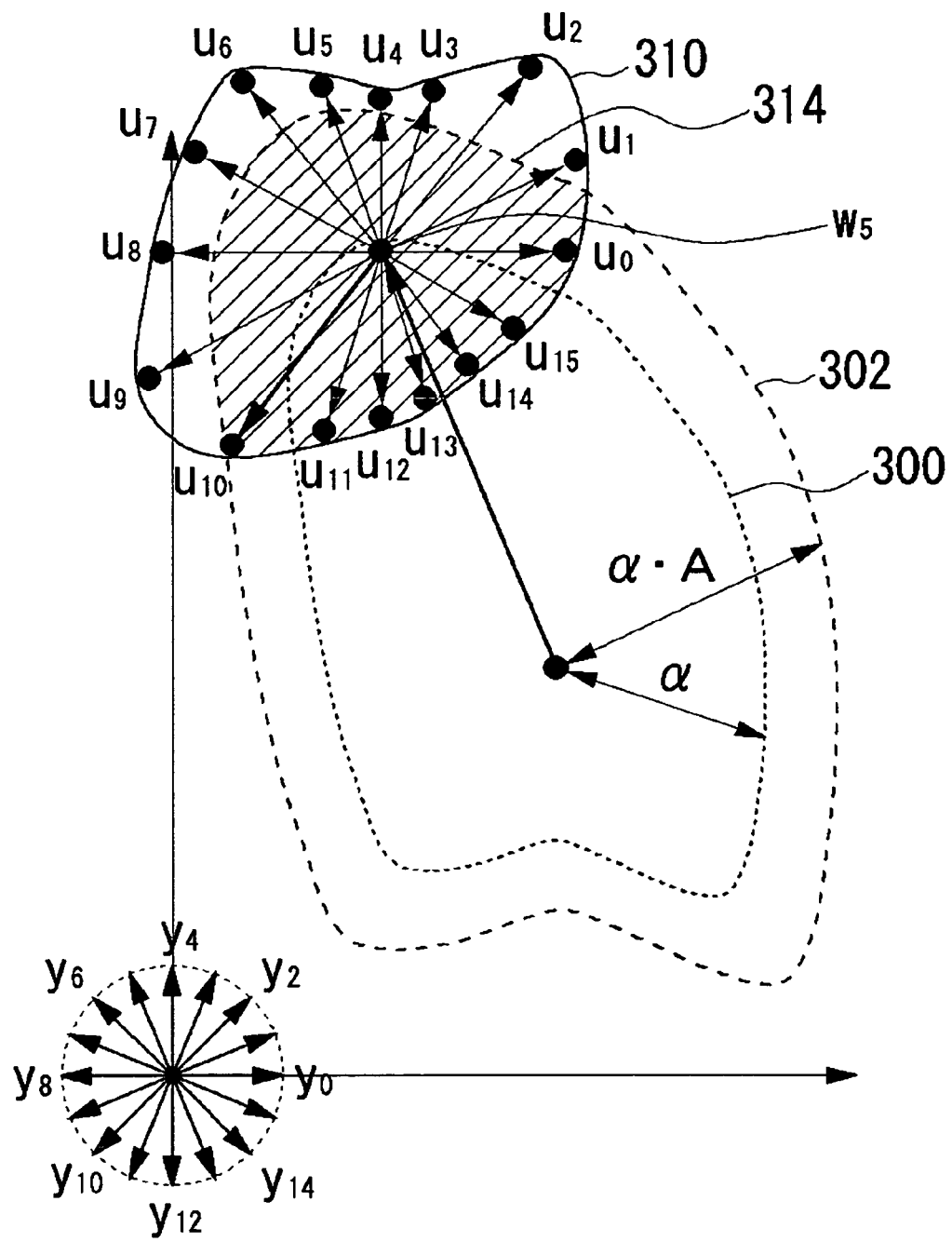
FIG. 18 explains another optimal selection example of the second watermark vector candidates.

In order to extend the searching range for the second watermarked host data, the scaling values $\alpha$ may be relaxed to $\alpha A$ by a relaxation coefficient A (herein A>1) and thereby the acceptable degradation region 300 may be extended to the relaxation acceptable degradation region 302, as shown in FIG. 18. In this case, since the second watermarked host data candidates are selected inside the intersection region 314 of the relaxation acceptable degradation region 302 for the host data v and the acceptable degradation region 310 determined for the optimal first watermarked host data $w_5$, the number of the selectable candidates increases and the optimal second watermarked host data $u_{10}$ of larger vector length can be obtained.

The procedure of selecting the second watermarked host data candidate $U_k$ of FIG. 17 and FIG. 18 is now explained in detail. When the first watermark is embedded by the GS-based method, the first watermarked host data W is given as follows:

$$w^+_{i,j} = V^+_{i,j} + \alpha^+_{i,j} x^k_i$$

$$w^-_{i,j} = V^-_{i,j} - \alpha^-_{i,j} x^k_i$$

where $\{v^\pm_{i,j}\}$ (i=0, ..., $n_1$−1, j=0, ..., $m_1$−1) are the sample sets selected from the host data V according to the secret key $K_1$.

The second watermarked host data candidate $U_k$ is given as follow:

$$u^{k+}_{i,j} = w\sim^+_{i,j} + \beta^+_{i,j} y^k_i$$

$$u^{k-}_{i,j} = w\sim^-_{i,j} - \beta^-_{i,j} y^k_i$$

where $\{w\sim^\pm_{i,j}\}$ (i=0, ..., $n_2$−1, j=0, ..., $m_2$−1), abbreviation of $\{w\sim^+_{i,0}, ..., w\sim^+_{i,m2-1}\}$ and $\{w\sim^-_{i,0}, ..., w\sim^-_{i,m2-1}\}$, are sample sets selected from the first watermarked host data W according to the secrete key $K_2$. The locations of the sample sets $\{w\sim\pm_{i,j}\}$ are different from those of $\{v^\pm_{i,j}\}$ which are selected as target data for embedding the first watermark X according to the secret key $K_1$, and the samples sets $\{w\sim\pm_{i,j}\}$ and $\{v^\pm_{i,j}\}$ are selected independently. Therefore, the sample sets herein are denoted by $w\sim^\pm_{i,j}$, being distinguished from $w^\pm_{i,j}$ used in the embedding formula of the first watermark X.

Since $w\sim^\pm_{i,j}$ change from the original host data values $v\sim^\pm_{i,j}$ by $\Delta^\pm_{i,j}$, the above formula can be redenoted as follows:

$$u^{k+}_{i,j} = v\sim^+_{i,j} + \Delta^+_{i,j} + \beta^+_{i,j} y^k_i$$

$$u^{k-}_{i,j} = v\sim^-_{i,j} + \Delta^-_{i,j} - \beta^-_{i,j} y^k_i$$

wherein the values of $\Delta^\pm_{i,j}$ are $+\alpha\sim^\pm_{i,j}$ or $-\alpha\sim^\pm_{i,j}$ depending on the values of the first watermark bits embedded therein, or $\Delta^\pm_{i,j} = 0$ if the first watermark bits are not embedded into the samples $v\sim^\pm_{i,j}$. It is to be noted that $v\sim^\pm_{i,j}$ are the samples of the original host data V at the same locations as the samples $w\sim^\pm_{i,j}$ determined according to the secret key $K_2$ and $\alpha\sim^\pm_{i,j}$ are the scaling values determined in the original samples $v\sim^\pm_{i,j}$.

The values $(\Delta\sim^\pm_{i,j} \pm \beta^\pm_{i,j} y^k_i)$ are the amount of change from the original samples $v\sim^\pm_{i,j}$ caused by doubly watermarking. On the other hand, $\alpha\sim^\pm_{i,j}$ are the maximum amount of change allowable for the original samples $v\sim^\pm_{i,j}$. Therefore, an index set C is defined as follows so that one candidate with the maximum SNR can be selected among the candidates whose indexes k belong to the index set C.

$$K = \operatorname{argmax}_{k \in c}(P_k / \sigma^2_k)$$

$$P_k = \sum_{i=0}^{n2-1} \left| \sum_{j=0}^{m2-1} (u^{+k}_{i,j} - u^{-k}_{i,j}) \right|^2 / n_2$$

$$\sigma^2_k = \sum_{i=0}^{n2-1} \left| \sum_{j=0}^{m2-1} (u^{+k}_{i,j} - u^{-k}_{i,j}) - P^{1/2}_k y^k_i \right|^2 / n_2$$

$$C = \{c : |\Delta^+_{i,j} + \beta^+_{i,j} y^c_i| \leq \alpha\sim^+_{i,j}, |\Delta^-_{i,j} - \beta^-_{i,j} y^c_i| \leq \alpha\sim^-_{i,j},$$

$$\forall i = 0, ..., n_2 - 1, \forall j = 0, ..., m_2 - 1\}$$

The index set C defines the region where all sample sets of the second watermarked host data candidate $U_k$ are within the acceptable degradation range for the host data V, and one candidate with the maximum SNR is selected among the second watermarked host data candidates $U_k$ existing inside this region. The region can be extended to the relaxation acceptable degradation region by replacing $\alpha\sim^+_{i,j}$ and $\alpha\sim^-_{i,j}$ with $A\alpha\sim^+_{i,j}$ and $A\alpha\sim^-_{i,j}$ respectively. By adopting the relaxation coefficient A, the robustness of the watermark can be enhanced, however, the distortion of the host data V increases. By applying the above procedure iteratively, a plurality of watermarks can be embedded without any serious distortion of the host data V.

By the above-mentioned index set C, it is required as a watermarking condition that all sample sets of the second watermarked host data candidate $U_k$ are within the acceptable degradation range for the host data V. However, it is not easy in general that all samples in the sample sets $\{w\sim^{\pm}_{i,j}\}$ (i=0, . . . , $n_2$−1, j=0, . . . , $m_2$−1) selected from the first watermarked host data W satisfy the constraint condition and it is probable that the second watermarked host data candidate $U_k$ cannot be selected effectively. Therefore, the constraint may be loosened and parts of samples may acceptably miss the above condition. The index set C in the case of the loosened constraint is defined as follows:

$$C=\{c:T<\delta\}$$

$$T=\Sigma_{i=0}^{n2-1}\Sigma_{j=0}^{m2-1}\{Q(|\Delta^+_{i,j}+\beta^+_{i,j}y^c_i|-\alpha\sim^+_{i,j})+Q(|\Delta^-_{i,j}-\beta^-_{i,j}y^c_i|-\alpha\sim^-_{i,j})\}$$

Herein Q(a)=1 if a>0, and Q(a)=0 otherwise. T gives the number of samples that violate the above strong constraint condition. The index set C is the set of the indexes of the candidates in which T or the number of samples violating the constraint condition is less than a constant δ which gives an upper limit of the penalty. The definition of Q(a) may be changed such that Q(a)=a if a>0 and Q(a)=0 otherwise. In this case, T does not give the number of samples violating the constraint condition but gives a degree of the violation.

By loosening the constraint condition as mentioned above, the searching area for the second watermarked host data candidates $U_k$ can be widened and at the same time the distortion of the host data V caused by double watermarking can be restrained.

By the above-mentioned method of restricting the double watermarking inside the acceptable degradation region for the host data V, the second watermarked host data candidates $U_k$ satisfying the constraint condition are selected after the second watermark Y is embedded into the first watermarked host data W. As another method, the second watermarked host data candidates $U_k$ may be generated so as to satisfy the constraint condition at the time of embedding the second watermark Y. In this case, the second watermarked host data candidate $U_k$ is given by the following formula.

$$u^{k+}_{i,j} = w\sim^+_{i,j}+\beta^+_{i,j}y^k_i \text{ if } |w\sim^+_{i,j}+\beta^+_{i,j}y^k_i - v\sim^+_{i,j}| \leq \alpha\sim^+_{i,j},$$

$$u^{k+}_{i,j} = v\sim^+_{i,j}+\alpha\sim^+_{i,j}y^k_i \text{ otherwise.}$$

$$u^{k-}_{i,j} = w\sim^-_{i,j}-\beta^-_{i,j}y^k_i \text{ if } |w\sim^-_{i,j}-\beta^-_{i,j}y^k_i - v\sim^-_{i,j}| \leq \alpha\sim^-_{i,j},$$

$$u^{k-}_{i,j} = v\sim^-_{i,j}-\alpha\sim^-_{i,j}y^k_i \text{ otherwise.}$$

Thereby, if the constraint condition is not satisfied at the time of embedding, the second watermark Y is embedded so that the visual distortion of the original host data V will not exceed the acceptable range. In other words, the second watermark Y is embedded at the intensity β, if the visual distortion when the second watermark Y is embedded into the first watermarked host data W at the intensity β is within the acceptable range α for the original host data V. If the visual distortion exceeds the acceptable range α, the second watermark Y is embedded with a lessened intensity so that the visual distortion can be within the acceptable range. This is realized by embedding the second watermark Y with the intensity α into the original host data V. In addition, the scaling parameters $\alpha\sim^{\pm}_{i,j}$ may be relaxed to $A\alpha\sim^{\pm}_{i,j}$ by the relaxation coefficient A (herein A>1) so that the acceptable range can be extended.

Embodiment 4

Figure 19:
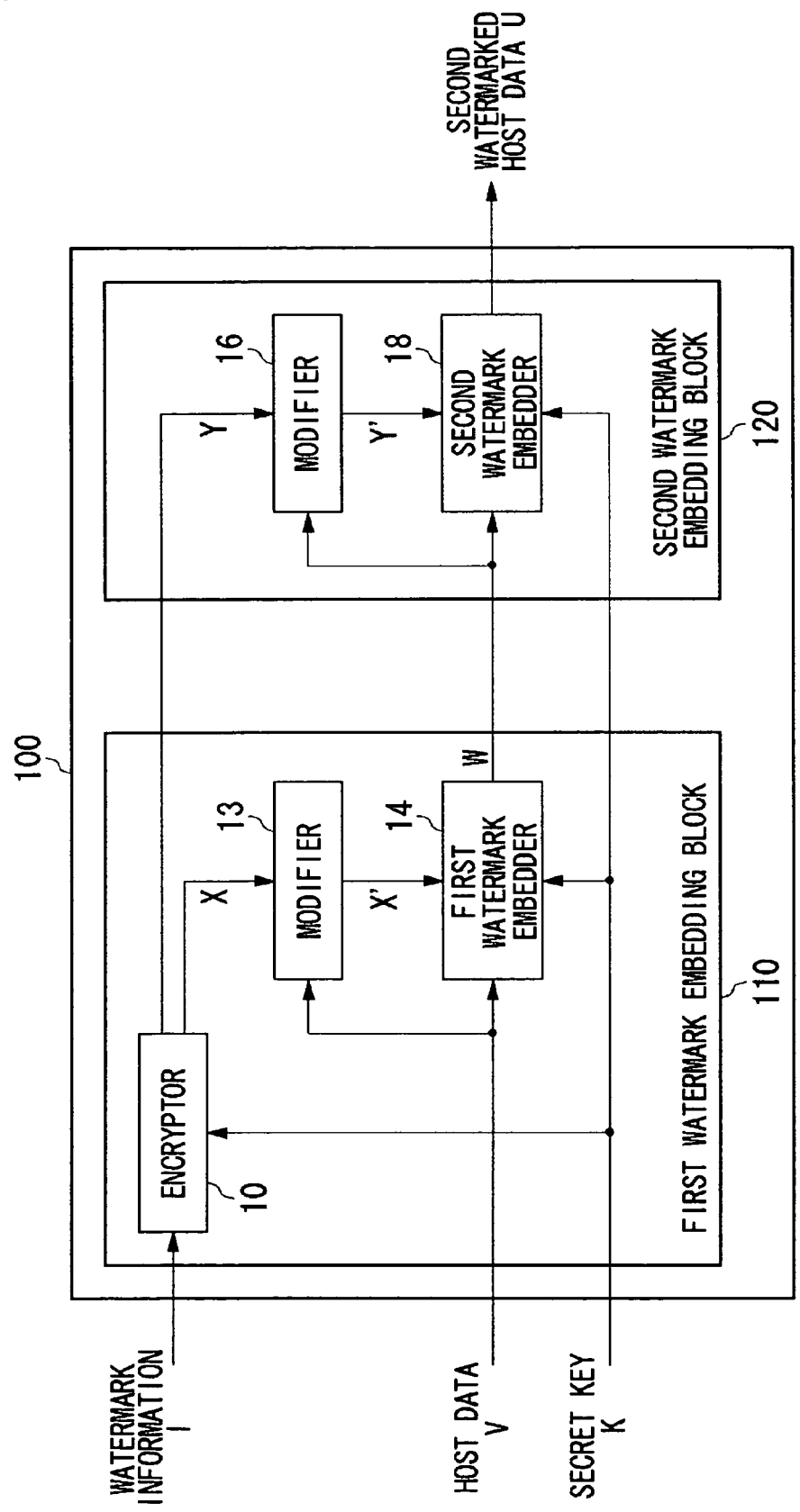
FIG. 19 shows a structure of a digital watermark embedding apparatus according to Embodiment 4.

FIG. 19 shows a structure of a digital watermark embedding apparatus 100 according to Embodiment 4. In the present embodiment, the watermark information I includes unimportant data and important data, and the digital watermark embedding apparatus 100 embeds the unimportant data as the first watermark X and the important data as the second watermark Y into the host data V. For instance, the important data is protection information such as content identification data, and the unimportant data is preliminary information such as URL (Uniform Resource Locator) of related to the content.

Using a secret key K, an encryptor 10 encrypts the unimportant data and important data included in the watermark information I into the first watermark X and the second watermark Y respectively. The encryptor 10 outputs the first watermark X and the second watermark Y respectively to the modifier 13 of the first watermark embedding block 110 and the modifier 16 of the second watermark embedding block 120.

The modifier 13 of the first watermark embedding block 110 scrambles the first watermark X and outputs it. The first watermark embedder 14 embeds the scrambled first watermark X' in the host data V using the secret key K and outputs the first watermarked host data W.

The modifier 16 of the second watermark embedding block 120 scrambles the second watermark Y and outputs it. The second watermark embedder 18 embeds the scrambled second watermark Y' in the first watermarked host data W using the secret key K and outputs the second watermarked host data U.

In general, there is a trade-off between the robustness of the digital watermark and the amount of the watermark data. The first watermark X in which the unimportant data has been encrypted is embedded into the host data V at a low level of robustness, having a larger amount of data. On the other hand, the second watermark Y in which the important data has been encrypted is embedded into the first watermarked host data W at a high level of robustness with increased redundancy, having a smaller amount of data.

The modifier 13 and the first watermark embedder 14 of the first watermark embedding block 110, in cooperation with each other, generate a plurality of the scrambled watermarks X' and embed each of them in the host data V, and thereby generate a plurality of candidates for the first watermarked host data W and select one of the candidates under the criteria of the higher robustness and smaller watermark visibleness.

Figure 20:
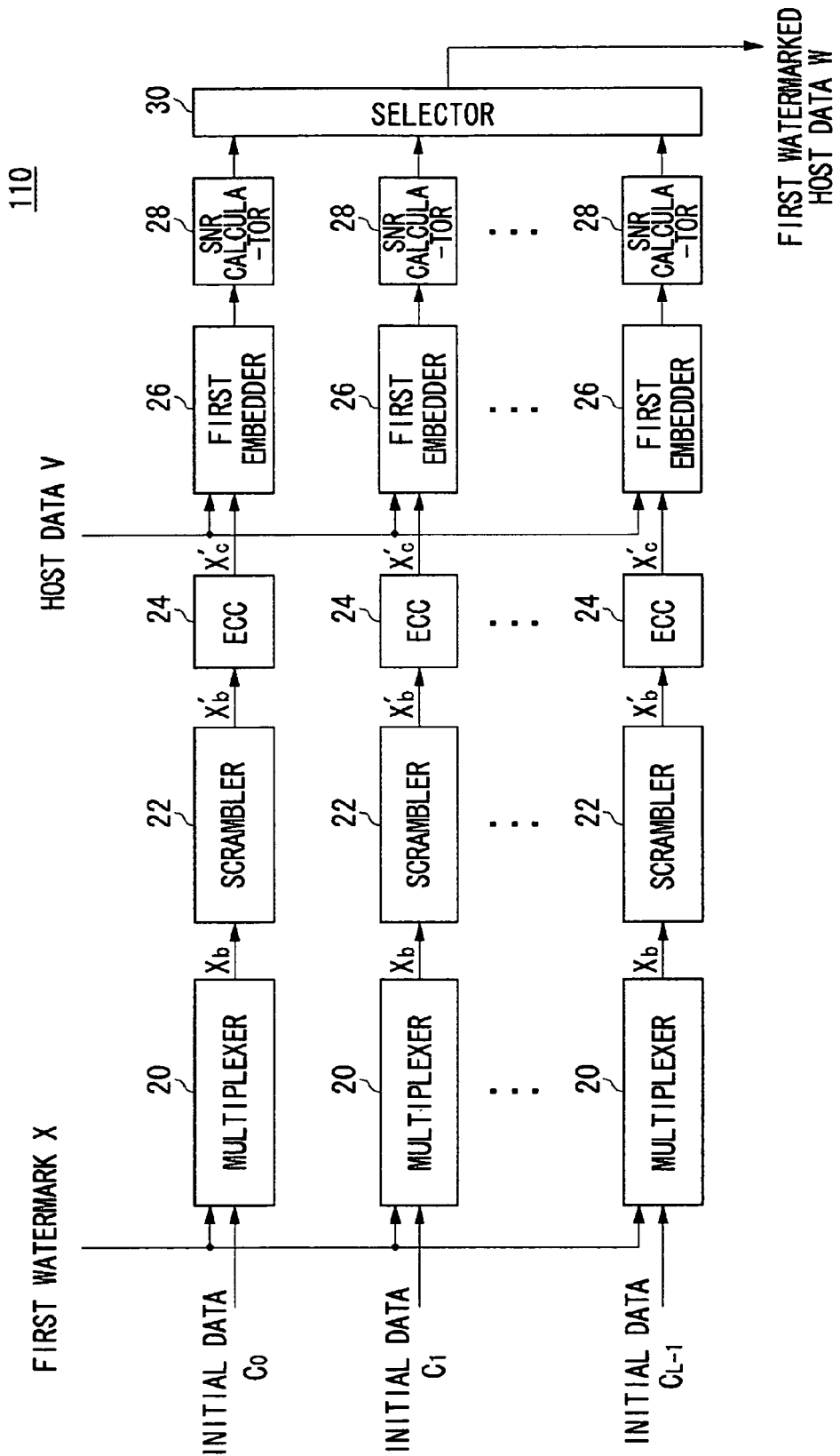
FIG. 20 is a block diagram of the first watermark embedding block of FIG. 19.

FIG. 20 is a block diagram of the modifier 13 and the first watermark embedder 14 of the first watermark embedding block 110. This configuration corresponds to that of the FIG. 7 in which the watermark location information P* input to the multiplexer 20 is replaced by the first watermark X, and the second embedder 27 for the first watermarked host data W is replaced by the first embedder 26 for the host data V.

The configuration of FIG. 20 may be adopted as the function blocks of the modifier 16 and the second watermark embedder 18 of the second watermark embedding block 120, when the first watermark embedding block 110 and the second watermark embedding block 120 use the same configuration. In this case, in FIG. 20, the first watermark X input to the multiplexer 20 is replaced by the second watermark Y, and the first embedder 26 for the host data V is replaced by the second embedder 27 for the first watermarked host data W. Furthermore, the configuration of FIG. 20 is sharable in the second watermark embedding block 120. In this case, the first watermarked host data W output from the selector 30 is fedback to the first embedder 26 and the second watermark Y is input to the multiplexer 20 and thereby the behavior of the second watermark embedding block 120 can be realized. Thereby, the functions of the first watermark embedding block 110 and the second watermark embedding block 120 are substantially realized in the same configuration so that the structure of hardware and software can be simplified.

Figure 21:
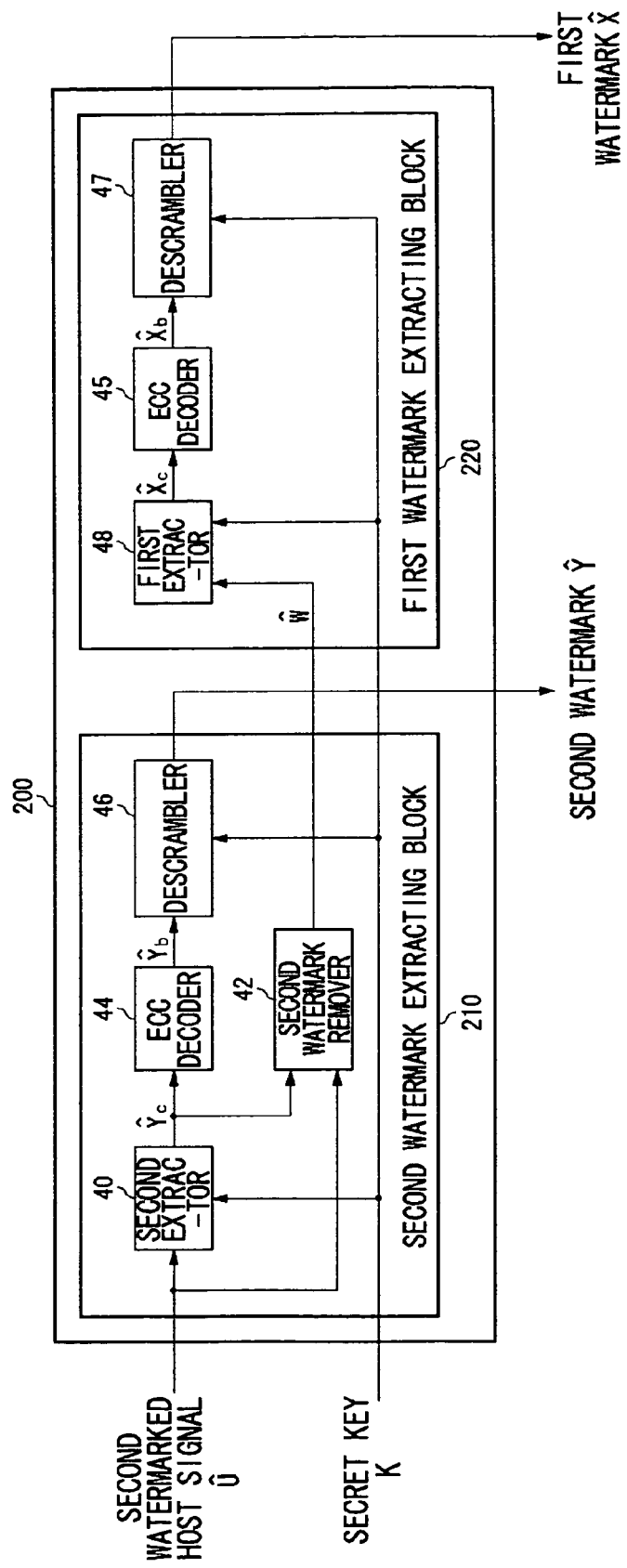
FIG. 21 shows a structure of a digital watermark extracting apparatus according to Embodiment 4.

FIG. 21 shows a structure of a digital watermark extracting apparatus 200 according to Embodiment 4. The structure and behavior of the second watermark extracting block 210 of FIG. 21 are the same as those of the second watermark extracting block 210 of FIG. 8, except that the second watermark Y output from the descrambler 46 is not provided to the first extractor 48 of the first watermark extracting block 220, but the second watermark Y is output from the digital watermark extracting apparatus 200.

The first watermark extractor 48 and the ECC decoder 45 of the first watermark extracting block 220 of FIG. 21 behave in the same way as the first watermark extractor 48 and the ECC decoder 45 of the first watermark extracting block 220 of FIG. 8 respectively, except that the first extractor 48 of the first watermark extracting block 220 of FIG. 21 does not utilize the watermark location information of the first watermark. In addition, in the first watermark extracting block 220 of FIG. 21, the descrambler 47 descrambles the first watermark $X^{\wedge}_b$ output from the ECC decoder 45 and removes the initial data of the head, and then outputs the first watermark $X^{\wedge}$.

The functions of the first extractor 48, the ECC decoder 45, and the descrambler 47 of the first watermark extracting block 220 can be realized by sharing the second extractor 40, the ECC decoder 44, and the descrambler 46 of the second watermark extracting block 210, when the second watermark extracting block 210 and the first watermark extracting block 220 use the same configuration. In this case, the first watermarked host data $W^{\wedge}$ from which the second watermark has been removed, which is output from the second watermark remover 42, is fedback to the second extractor 40 and thereby the functions of the first watermark extracting block 220 can be realized and the configuration can be simplified.

The first watermark X has a larger amount of data with a lower level of robustness than the second watermark Y. Therefore, if a relatively small noise is added to the second watermarked host data U, both the first watermark X and the second watermark Y can be detected correctly. If a strong noise is added, the first watermark X with a low level of robustness can be broken, however, the second watermark Y can be detected correctly. Therefore, the important data can be obtained even if the watermarked host data is subject to a strong noise.

The first watermark X to be embedded first may have a higher level of robustness than the second watermark Y. In this case, the first watermark X is embedded in a reversible watermarking method. In other words, the order of embedding can be reversed and the first watermark X including the important data can be first embedded with a higher level of robustness and thereafter the unimportant data can be embedded. In this case, the extracting apparatus first extracts the first watermark X related to the important data with a higher level of robustness and removes the interference with the second watermark Y by performing the reverse computation of watermarking using the extracted watermark bits, and thereafter extracts the second watermark Y. Since the first watermark X and the second watermark Y do not interfere with each other, the watermarks are not necessarily extracted in reverse order of the watermarking order.

Embodiment 5

Figure 22:
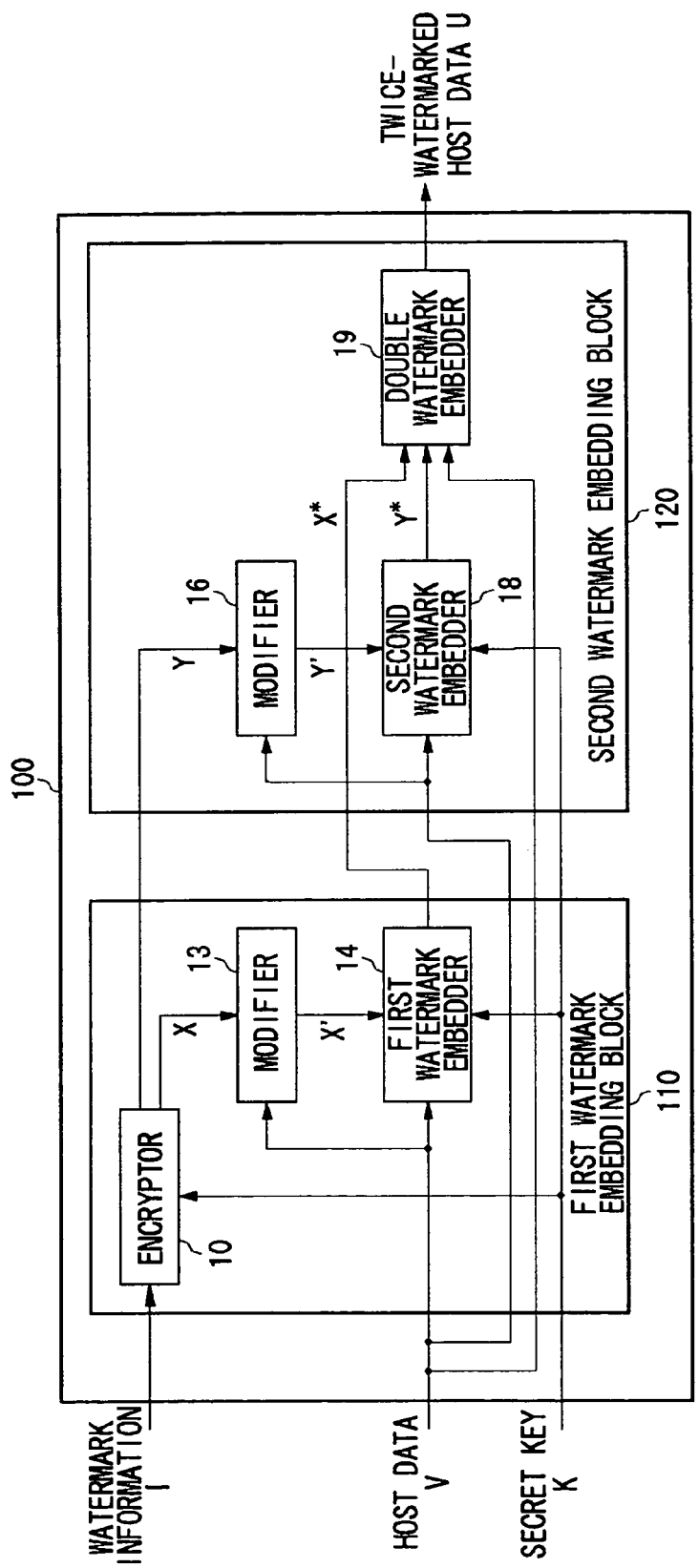
FIG. 22 shows a structure of a digital watermark embedding apparatus according to Embodiment 5.

FIG. 22 shows a structure of a digital watermark embedding apparatus 100 according to Embodiment 5. The digital watermark embedding apparatus 100 of the present embodiment scrambles both the first watermark X and the second watermark Y by the GS-based method and embeds them into the host data V. The digital watermarking apparatus 100 of Embodiment 4 embeds the second watermark Y into the first watermarked host data W in which the first watermark X has been embedded, whereas in the present embodiment the target data for embedding the second watermark Y by the GS-based method is not the first watermarked host data W but the host data V.

Using a secret key K, an encryptor 10 encrypts two kinds of data included in the watermark information I into the first watermark X and the second watermark Y. The encryptor 10 outputs the first watermark X and the second watermark Y respectively to the modifier 13 of the first watermark embedding block 110 and the modifier 16 of the second watermark embedding block 120.

The modifier 13 of the first watermark embedding block 110 scrambles the first watermark X and outputs it. The first watermark embedder 14 embeds the scrambled first watermark X' in the host data V using the secret key K. The modifier 13 and the first watermark embedder 14, in cooperation with each other, generate a plurality of candidates for the scrambled watermarks X' and select one of candidates as an optimal first watermark X* according to the robustness of each of the candidates embedded in the host data V. The first watermark embedder 14 gives the selected optimal first watermark X* to the double watermark embedder 19.

The modifier 16 of the second watermark embedding block 120 scrambles the second watermark Y and outputs it. The second watermark embedder 18 embeds the scrambled second watermark Y' in the host data V using the secret key K. The modifier 16 and the second watermark embedder 18, in cooperation with each other, generate a plurality of candidates for the scrambled watermarks Y' and select one of candidates as an optimal first watermark Y* according to the robustness of each of the candidates embedded in the host data V. The second watermark embedder 18 gives the selected optimal second watermark Y* to the double watermark embedder 19.

Figure 23:
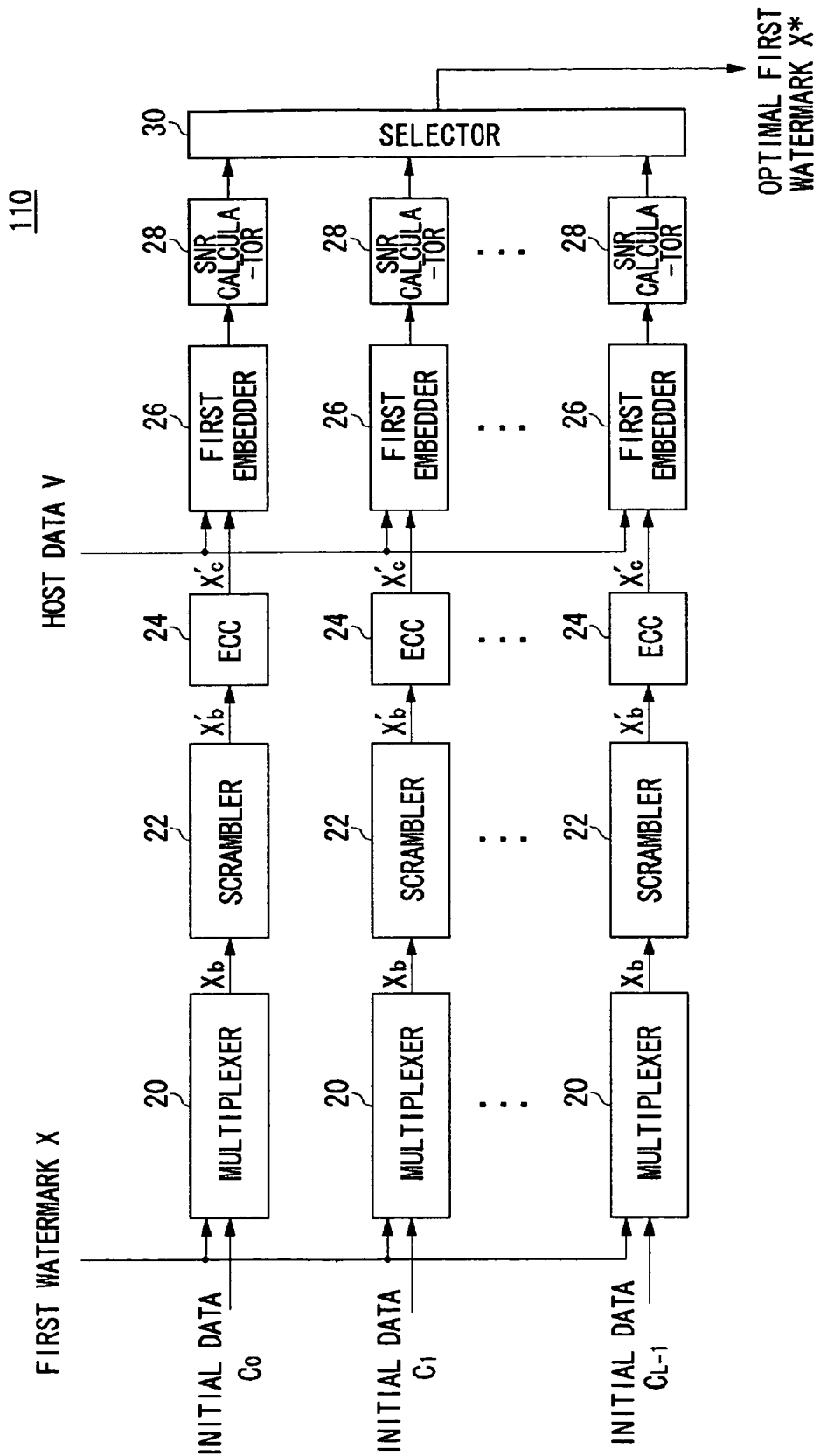
FIG. 23 is a block diagram of the first watermark embedding block of FIG. 22.

FIG. 23 is a block diagram of the modifier 13 and the first watermark embedder 14 of the first watermark embedding block 110. This configuration is the same as that of FIG. 20 except for the behavior of the selector 30. The first embedder 26 embeds the scrambled watermark X' into the host data V by a reversible watermarking method and generates the candidates for the first watermarked host data W. The SNR calculator 28 evaluates the robustness of the first watermark X hidden in the candidates for the first watermarked host data W. The selector 30 selects one of the candidates for the first watermarked host data W for which the evaluation of the robustness of the first watermark X is the best, and outputs the scrambled first watermark X' embedded in the first watermarked host data W as an optimal first watermark X*.

The configuration of FIG. 23 may be adopted as the function blocks of the modifier 16 and the second watermark embedder 18 of the second watermark embedding block 120, when the first watermark embedding block 110 and the second watermark embedding block 120 use the same configuration. In this case, in FIG. 23, the first watermark X input to the multiplexer 20 is replaced by the second watermark Y, and the first embedder 26 for the host data V is replaced by the second embedder 27 for the host data V. The second embedder 27 embeds the scrambled watermark Y' into the host data V by a reversible watermarking method and generates the candidates for the second watermarked host data T. The SNR calculator 28 evaluates the robustness of the second watermark Y hidden in the candidates for the second watermarked host data T. The selector 30 selects one of the candidates for the second watermarked host data T for which evaluation of the robustness of the second watermark Y is the best, and outputs the scrambled second watermark Y' embedded in the second watermarked host data T as an optimal second watermark Y*.

Thus, the modifier 13 and the first watermark embedder 14 of the first watermark embedding block 110, and the modifier 16 and the second watermark embedder 18 of the second watermark embedding block 120 can be realized in the same function blocks. Also, the optimal first watermark X* and the optimal second watermark Y* can be computed in parallel or in any order.

In addition, if the input to the multiplexer 20 is switched from the first watermark X to the second watermark Y in FIG. 23, the configuration of FIG. 23 can be shared as the configuration of the modifier 16 and the second watermark embedder 18 of the second watermark embedding block 120. In this case, the parallel processing cannot be performed, however, the structure of hardware and software can be shared and simplified.

Referring to FIG. 22 again, the double watermark embedder 19 receives the optimal first watermark X* output from the first watermark embedder 14 and the optimal second watermark Y* output from the second watermark embedder 18, and embeds the optimal first watermark X* and the optimal second watermark Y* into the host data V by a reversible watermarking method and then outputs the twice-watermarked host data U. The double watermark embedder 19 embeds the optimal first watermark X* into the host data V in the same way as the first embedder 26 of the first watermark embedding block 110 as shown in FIG. 23, and also embeds the optimal second watermark Y* into the host data V in the same way as the second embedder 27 of the second watermark embedding block 120.

In embedding the optimal first watermark X* and the optimal second watermark Y*, the double watermark embedder 19 can adjust the watermark power between the two watermarks so that the watermarked host data can be within the acceptable visual degradation range. For instance, the two watermarks can be embedded almost within the acceptable degradation range by embedding the watermark defined as $B\alpha X^*+(1-B)\beta Y^*$. Herein B is a constant satisfying $0<B<1$. Since the optimal first watermark X* and the optimal second watermark Y* are assumed to be embedded in the original host data V, the scaling parameters $\alpha$ and $\beta$ are equal. If B is set to 0.5, the power of the two watermarks can be equalized. The weight B of the watermark power can be adjusted according to the difference in the importance of the two kinds of watermarks.

In the above explanation, the first watermark embedder 14 of the first watermark embedding block 110 outputs the optimal first watermark X* to the double watermark embedder 19, however, the first watermark embedder 14 may provide the first watermarked host data W, in which the optimal first watermark X* has been embedded, to the double watermark embedder 19. In this case, the double watermark embedder 19 receives the first watermarked host data W from the first watermark embedder 14 and the optimal second watermark Y* from the second watermark embedder 18, and further embeds the optimal second watermark Y* into the first watermarked host data W and thereby outputs the twice-watermarked host data U. It is to be noted herein that the target samples, for which the optimal scrambled sequence is generated using the second watermark Y by the GS-based method, are not the first watermarked host data W in which the first watermark X has been embedded, but the original host data V.

Thus, the digital watermark embedding apparatus 100 of the present embodiment evaluates the robustness of the first watermark X embedded in the host data V and the robustness of the second watermark Y embedded in the host data V individually and thereafter generates the twice-watermarked host data U by embedding the optimal candidate of the first watermark X and the optimal candidate of the second watermark Y, for each of which evaluation of the robustness is best, into the host data V. Since the original host data V is the common target data for watermarking and the optimal candidates for the first watermark X and the second watermark Y are selected independently, the iterative decoding of the first watermark X and the second watermark Y as described later can be performed effectively.

Figure 24:
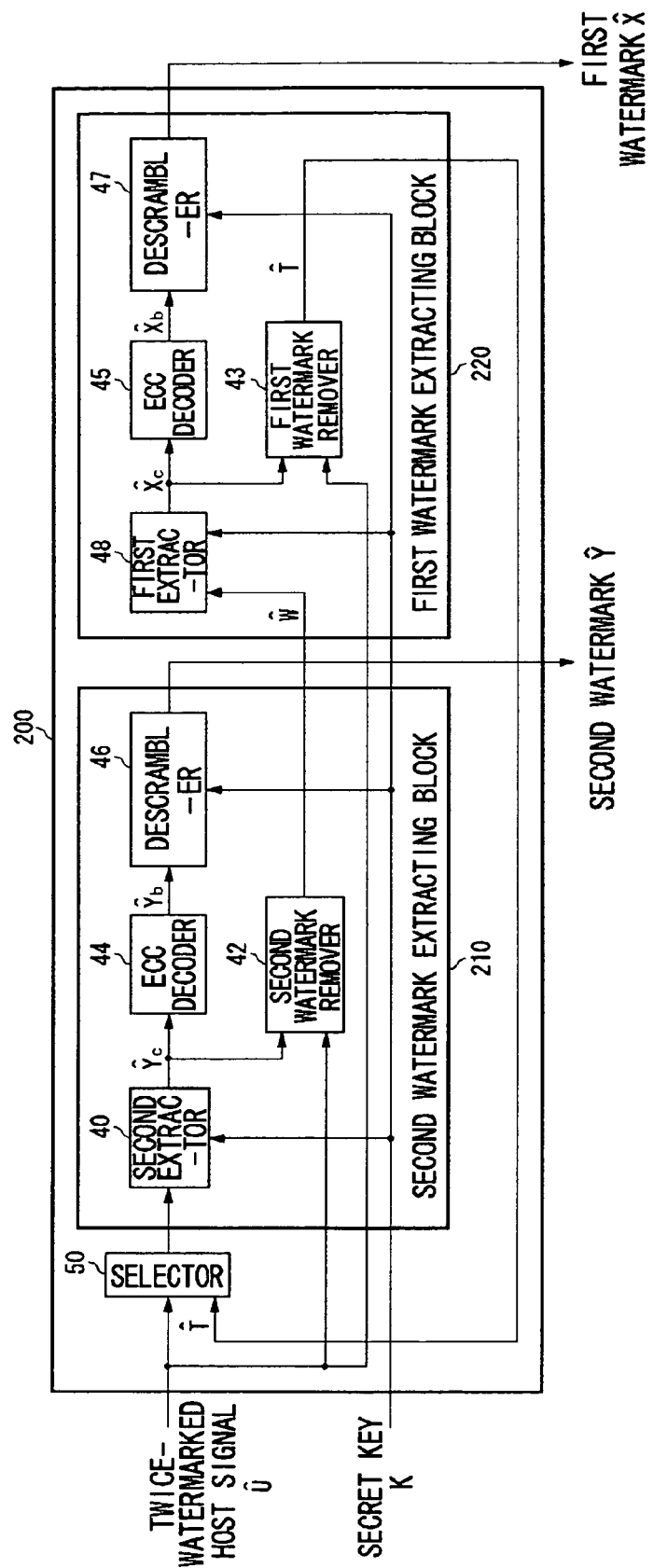
FIG. 24 shows a structure of a digital watermark extracting apparatus according to Embodiment 5.

FIG. 24 shows a structure of a digital watermark extracting apparatus 200 according to Embodiment 5. The digital watermark extracting apparatus 200 includes the second watermark extracting block 210 and the first watermark extracting block 220, and extracts the first watermark X and the second watermark Y from the twice-watermarked host signal U^ by the iterative decoding process which is described now. First, the outline of the iterative decoding process is described.

At the first iteration of the iterative decoding, the second watermark extracting block 210 extracts the second watermark Y from the twice-watermarked host signal U^ and removes the second watermark Y from the twice-watermarked host signal U^, and then provides the first watermarked host signal W^, from which the second watermark Y has been removed, to the first watermark extracting block 220.

The first watermark extracting block 220 extracts the first watermark X from the first watermarked host signal W^ provided by the second watermark extracting block 210 and removes the first watermark X from the twice-watermarked host signal U^, and then provides the second watermarked host signal T^, from which the first watermark X has been removed, to. the second watermark extracting block 210 as a feedback input.

At the second iteration of the iterative decoding and afterwards, the second watermark extracting block 210 extracts the second watermark Y from the second watermarked host signal T^ provided by the first watermark extracting block 220, and removes the second watermark Y from the twice-watermarked host signal U^, and then provides the first watermarked host signal W^, from which the second watermark Y has been removed, to the first watermark extracting block 220. Thereafter the sequence of the process is iterated.

The detailed structure and behavior of the digital watermark extracting apparatus 200 using the iterative decoding method is now explained. The second extractor 40 of the second watermark extracting block 210 extracts the second watermark $Y^{\wedge}_c$ embedded in the twice-watermarked host signal $U^{\wedge}$ using the secret key K. The second watermark remover 42 removes the second watermark $Y^{\wedge}_c$, which has been extracted by the second extractor 40, from the twice-watermarked host signal $U^{\wedge}$ by performing the inverse transform of the second watermarking process employed by the double watermark embedder 19 of the digital watermark embedding apparatus 100, and then outputs the first watermarked host signal $W^{\wedge}$.

Using the secret key K, the first extractor 48 of the first watermark extracting block 220 extracts the first watermark $X^{\wedge}_c$ embedded in the first watermarked host signal $W^{\wedge}$ which is provided by the second watermark remover 42 of the second watermark extracting block 210. The first watermark remover 43 removes the first watermark $X^{\wedge}_c$, which has been extracted by the first extractor 48, from the twice-watermarked host signal $U^{\wedge}$ by performing the inverse transform of the first watermarking process employed by the double watermark embedder 19 of the digital watermark embedding apparatus 100, and then outputs the second watermarked host signal $T^{\wedge}$.

The second watermarked host signal $T^{\wedge}$ output from the first watermark remover 43 is input to the selector 50. The selector 50 receives the input of the twice-watermarked host signal $U^{\wedge}$ and the second watermarked host signal $T^{\wedge}$, and switches over so as to provide the twice-watermarked host signal $U^{\wedge}$ to the second watermark extracting block 210 at the first iteration of the iterative decoding process and to provide the second watermarked host signal $T^{\wedge}$ to the second watermark extracting block 210 at the second iteration and afterwards. Thereby, the second extractor 40 of the second watermark extracting block 210 extracts the second watermark $Y^{\wedge}_c$ from the host signal, from which the estimated first watermark $X^{\wedge}_c$ has been removed, at the second iteration of the iterative decoding process and afterwards.

Thereafter, the second watermark remover 42 removes the newly extracted second watermark $Y^{\wedge}_c$ from the twice-watermarked host signal $U^{\wedge}$ and provides the first watermarked host signal $W^{\wedge}$ to the first extractor 48 of the first watermark extracting block 220, and thereby the sequence of the decoding process is iterated. The second watermark extracting block 210 and the first watermark extracting block 220 extract the second watermark $Y^{\wedge}_c$ and the first watermark $X^{\wedge}_c$ respectively, while each of the watermark extracting blocks 210 and 220 removes the interference by the other watermark. Therefore, the detection accuracy of the watermarks can be gradually improved by the iterative decoding.

It is to be noted that the estimated values $\alpha^{\wedge}$ and $\beta^{\wedge}$ of the scaling parameters $\alpha$ and $\beta$ according to the human visual system are used in extracting the first watermark $X^{\wedge}_c$ and the second watermark $Y^{\wedge}_c$. The estimated values $\alpha^{\wedge}$ and $\beta^{\wedge}$ may be multiplied by the adjustment coefficient $\eta$ ($0<\eta\leq1$) and the adjustment coefficient $\eta$ may be set to a small value at the initial stage of the iterative decoding and gradually increased to a larger value toward 1 so that the scaling parameters of the human visual system can be adjusted according to the improvement of the watermark detection accuracy. Therefore, the noise caused by the erroneous detection of the watermark bits can be reduced at the initial stage of the iterative decoding and the convergence of the iterative decoding can be improved.

At the final stage of the iterative decoding, the ECC decoder 44 of the second watermark extracting block 210 corrects errors using the parity bits added to the second watermark $Y^{\wedge}_c$ extracted by the second extractor 40 and thereby generates the second watermark $Y^{\wedge}_b$. The descrambler 46 descrambles the second watermark $Y^{\wedge}_b$ output from the ECC decoder 44 and removes the initial data at the head, and thereby outputs the second watermark $Y^{\wedge}$.

Likewise, at the final stage of the iterative decoding, the ECC decoder 45 of the first watermark extracting block 220 corrects errors using the parity bits added to the first watermark $X^{\wedge}_c$ extracted by the first extractor 48 and thereby generates the first watermark $X^{\wedge}_b$. The descrambler 47 descrambles the first watermark $X^{\wedge}_b$ output from the ECC decoder 45 and removes the initial data at the head, and thereby outputs the first watermark $X^{\wedge}$.

According to the present embodiment, in extracting one watermark from the twice-watermarked host data, the watermark bits are estimated using the host data from which the other watermark has been removed so that the interference by the other watermark can be cancelled and the detection accuracy can be improved. In addition, the host data from which each watermark has been removed is exchanged with each other and the process of extracting the watermarks is iterated so that the errors in the watermark bits can be gradually reduced and the watermarks can be extracted with a higher level of accuracy. In particular, when the interference between the watermarks is large, the detection accuracy by the iterative decoding is highly improved.

Embodiment 6

Figure 25:
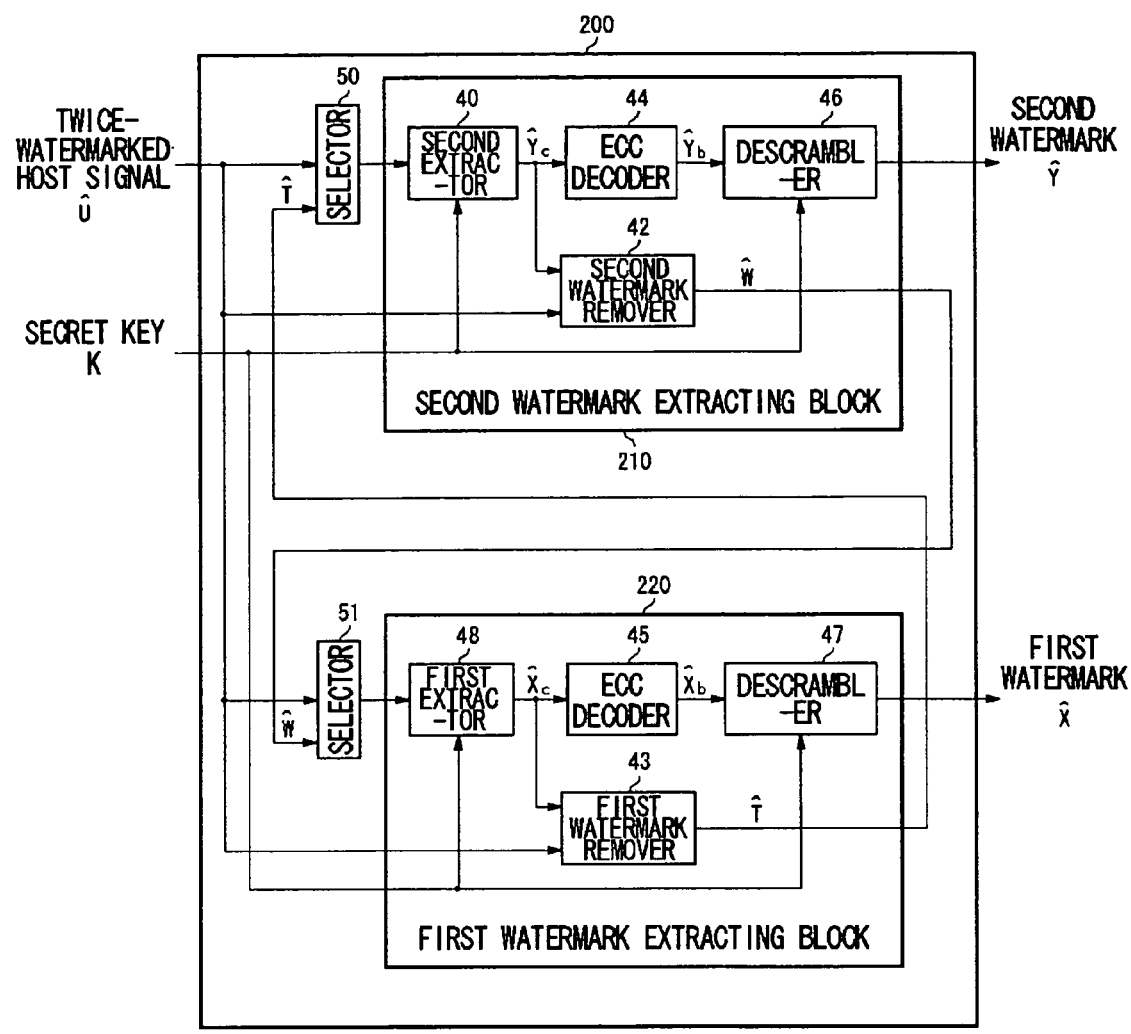
FIG. 25 shows a structure of a digital watermark extracting apparatus according to Embodiment 6.

FIG. 25 shows a structure of a digital watermark extracting apparatus 200 according to Embodiment 6. The digital watermark extracting apparatus 200 of Embodiment 5 shown in FIG. 24 has a configuration in which the second watermark extracting block 210 and the first watermark extracting block 220 are connected in series. In Embodiment 5, the processing result of the second watermark extracting block 210 is utilized in the first watermark extracting block 220, and the processing result of the first watermark extracting block 220 is further fedback to the second watermark extracting block 210 and thereby the extraction of the second watermark and the extraction of the first watermark are sequentially iterated. On the other hand, the digital watermark extracting apparatus 200 of the present embodiment has a configuration in which the second watermark extracting block 210 and the first watermark extracting block 220 are connected in parallel. In the present embodiment, the second watermark extracting block 210 and the first watermark extracting block 220 perform processing in parallel and exchange the processing results with each other and thereby the extraction of the second watermark and the extraction of the first watermark are iterated in parallel.

The second watermarked host signal $T^{\wedge}$ output from the first watermark remover 43 of the first watermark extracting block 220 is input to a selector 50 located on the host signal input to the second watermark extracting block 210. The first watermarked host signal $W^{\wedge}$ output from the second watermark remover 42 of the second watermark extracting block 210 is input to a selector 51 located on the host signal input to the first watermark extracting block 220.

The selector 50 located on the host signal input to the second watermark extracting block 210 receives the input of the twice-watermarked host signal $U^{\wedge}$ and the second watermarked host signal $T^{\wedge}$ and switches over so as to provide the twice-watermarked host signal $U^{\wedge}$ to the second watermark extracting block 210 at the first iteration of the iterative process and to provide the second watermarked host signal $T^{\wedge}$ to the second watermark extracting block 210 at the second iteration and afterwards. Likewise, the selector 51 located on the host signal input to the first watermark extracting block 220 receives the input of the twice-watermarked host signal U^ and the first watermarked host signal W^ and switches over so as to provide the twice-watermarked host signal U^ to the first watermark extracting block 220 at the first iteration of the iterative process and to provide the first watermarked host signal W^ to the first watermark extracting block 220 at the second iteration and afterwards.

At the second iteration of the iterative process and afterwards, the second extractor 40 of the second watermark extracting block 210 extracts the second watermark $Y^{\wedge}_c$ from the host signal from which the first watermark $X^{\wedge}_c$ has been removed by the first watermark remover 43. In parallel, the first extractor 48 of the first watermark extracting block 220 extracts the first watermark $X^{\wedge}_c$ from the host signal from which the second watermark $Y^{\wedge}_c$ has been removed by the second watermark remover 42. By the iterative decoding, the accuracy of the second watermark $Y^{\wedge}_c$ extracted by the second extractor 40 and the accuracy of the first watermark $X^{\wedge}_c$ extracted by the first extractor 48 are gradually improved.

Embodiment 7

Figure 26:
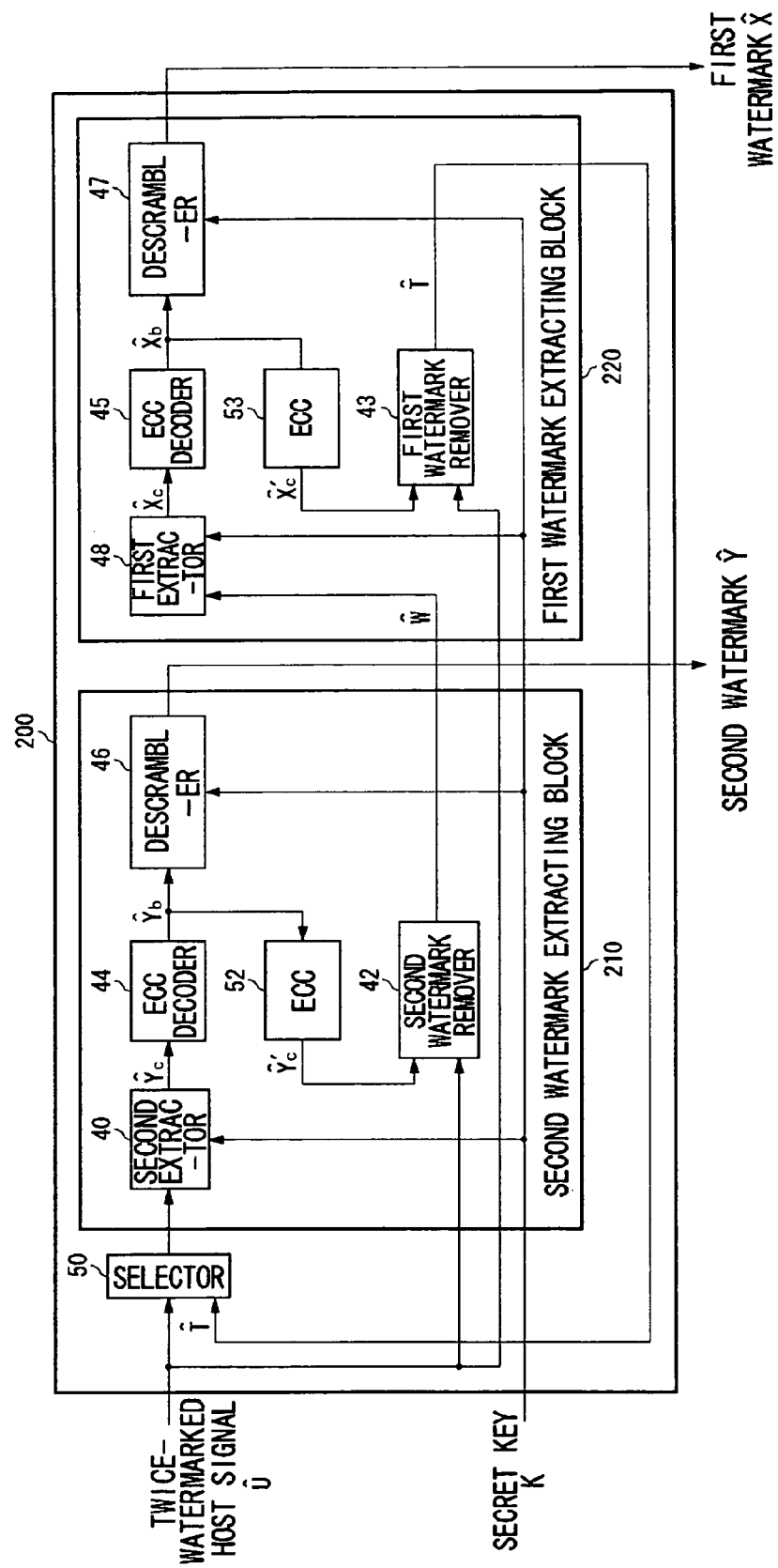
FIG. 26 shows a structure of a digital watermark extracting apparatus according to Embodiment 7.

FIG. 26 shows a structure of a digital watermark extracting apparatus 200 according to Embodiment 7. The digital watermark extracting apparatus 200 of Embodiment 5 shown in FIG. 24 removes the watermarks from the twice-watermarked host signal U^ using the second watermark $Y^{\wedge}_c$ and the first watermark $X^{\wedge}_c$ before the error correction. On the other hand, the digital watermark extracting apparatus 200 of the present embodiment removes the watermarks from the twice-watermarked host signal U^ using the second watermark $Y^{\wedge}_b$ and the first watermark $X^{\wedge}_b$ after the error correction.

The ECC 52 of the second watermark extracting block 210 receives the input of the second watermark $Y^{\prime}_b$ whose errors have been corrected by the ECC decoder 44 and generates the second watermark $Y^{\wedge}_c{}'$ by adding the parity bits for error correction to the error-corrected second watermark $Y^{\wedge}_b$ again, and gives it to the second watermark remover 42. The second watermark remover 42 removes the second watermark $Y^{\wedge}_c{}'$, which has been encoded by the ECC 52, from the twice-watermarked host signal U^, and outputs the first watermarked host signal W^. The second watermark remover 42 can remove the watermark at a high level of accuracy by utilizing more reliable watermark bits whose errors have been corrected by the ECC decoder 44.

The structure of the first watermark extracting block 220 is the same as that of the second watermark extracting block 210. The ECC 53 of the first watermark extracting block 220 receives the input of the first watermark $X^{\wedge}_b$ whose errors have been corrected by the ECC decoder 45 and generates the first watermark $X^{\wedge}_c{}'$ by adding the parity bits for error correction to the error-corrected first watermark $X^{\wedge}_b$ again, and gives it to the first watermark remover 43. The first watermark remover 43 removes the first watermark $X^{\wedge}_c{}'$, which has been encoded by the ECC 53, from the twice-watermarked host signal U^, and outputs the second watermarked host signal T^.

Since the digital watermark extracting apparatus 200 of the present embodiment removes the watermark by using the more reliable error-corrected watermark bits, the detection accuracy of the multiple watermarks can be highly improved. It is to be noted that the second watermark extracting block 210 and the first watermark extracting block 220 of the digital watermark extracting apparatus 200 can be configured as those in a parallel type of the digital watermark extracting apparatus 200 of Embodiment 6.

Embodiment 8

Figure 27:
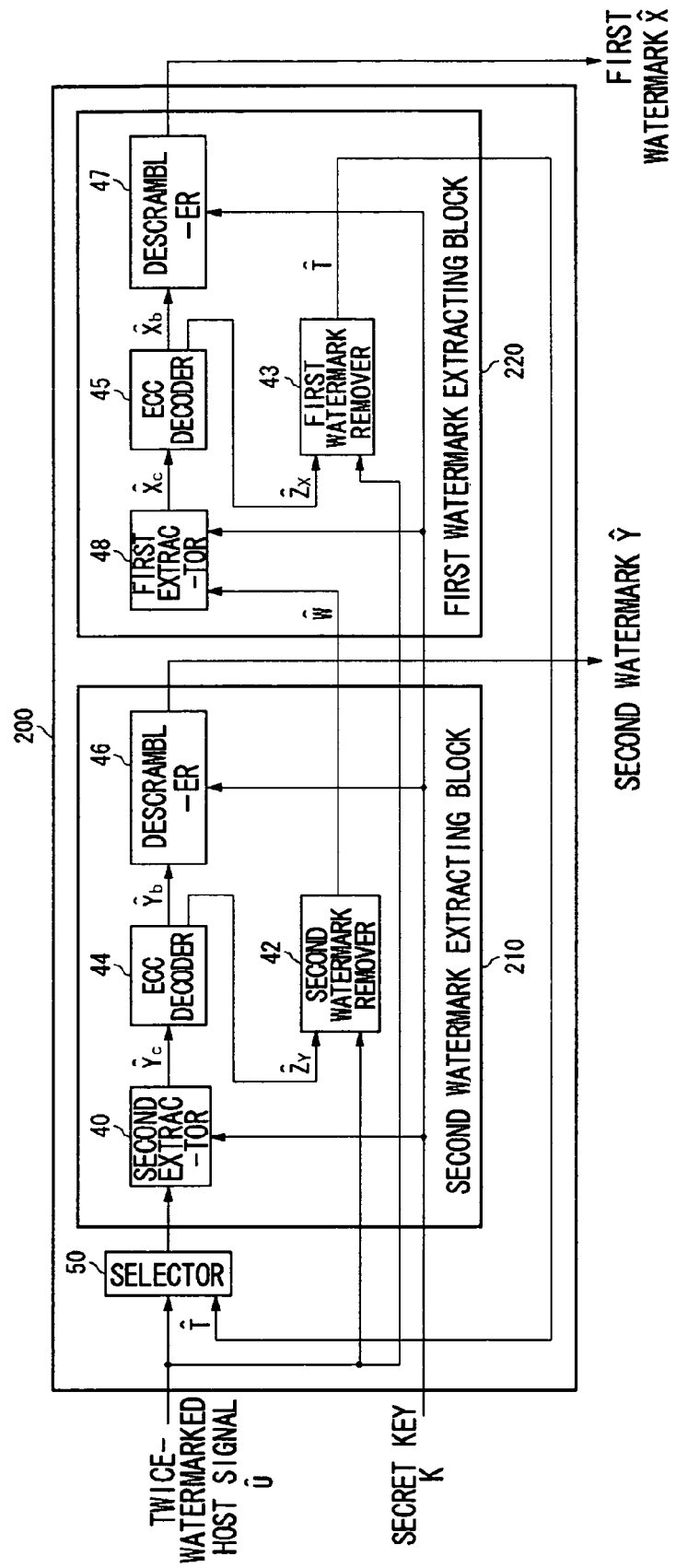
FIG. 27 shows a structure of a digital watermark extracting apparatus according to Embodiment 8.

FIG. 27 shows a structure of a digital watermark extracting apparatus 200 according to Embodiment 8. The digital watermark extracting apparatus 200 of the present embodiment removes the watermarks from the twice-watermarked host signal U^ by using the error-corrected second watermark and the error-corrected first watermark as the digital watermark extracting apparatus 200 of Embodiment 7 shown in FIG. 26 does, however, in the present embodiment, soft decision outputs are used in the watermark removing process.

The ECC decoder 44 of the second watermark extracting block 210 is configured by a soft output decoder such as a Viterbi decoder, turbo decoder, MAP (Maximum A posteriori Probability) decoder, or the like, and receives the input of the second watermark $Y^{\wedge}_c$ and outputs a soft decision value $Z^{\wedge}_Y$ of the second watermark $Y^{\wedge}_c$ to the second watermark remover 42. The second watermark remover 42 removes the second watermark $Z^{\wedge}_Y$ given as the soft decision value, which has been computed by the ECC decoder 44, from the twice-watermarked host signal U^ and thereby outputs the first watermarked host signal W^. In other words, in the case of FIG. 26 the interference component $\beta^{\wedge} Y^{\wedge}_c{}'$ of the second watermark is removed by the inverse transform of watermarking, whereas in FIG. 27 the interference component $\beta^{\wedge} Z^{\wedge}_Y$ of the second watermark in proportion to its reliability is removed. If $Z^{\wedge}_Y$ exceeds 1, $Z^{\wedge}_Y$ is set to 1 and then the process of removing the second watermark is performed.

The structure of the first watermark extracting block 220 is the same as that of the second watermark extracting block 210. The ECC decoder 45 of the first watermark extracting block 220 is configured by a soft output decoder, and receives the input of the first watermark $X^{\wedge}_c$ and outputs a soft decision value $Z^{\wedge}_X$ of the first watermark $X^{\wedge}_c$ to the first watermark remover 43. The first watermark remover 43 removes the first watermark $Z^{\wedge}_X$ given as the soft decision value, which has been computed by the ECC decoder 45, from the twice-watermarked host signal U^ and outputs the second watermarked host signal T^. In other words, in the case of FIG. 26 the interference component $\alpha^{\wedge} X^{\wedge}_c{}'$ of the first watermark is removed by the inverse transform of watermarking, whereas in FIG. 27 the interference component $\alpha^{\wedge} Z^{\wedge}_x$ of the first watermark in proportion to its reliability is removed. If $Z^{\wedge}_x$ exceeds 1, $Z^{\wedge}_x$ is set to 1 and then the process of removing the first watermark is performed.

At the final stage of the iterative decoding process, the ECC decoder 44 of the second watermark extracting block 210 decodes on the input second watermark $Y^{\wedge}_c$ by hard decision and thereby obtains the error-corrected second watermark $Y^{\wedge}_b$ and outputs it to the descrambler 46. Likewise, the ECC decoder 45 of the first watermark extracting block 220 decodes on the input first watermark $X^{\wedge}_c$ by hard decision and thereby obtains the error-corrected first watermark $X^{\wedge}_b$ and outputs it to the descrambler 47.

At the initial stage of the iterative decoding process, the reliability of the decoding results by the ECC decoders 44 and 45 is low and the soft decision values $Z^{\wedge}_Y$ and $Z^{\wedge}_X$ are close to zero in general, however, the decoding result could be −0.2, for instance, in spite of the watermark bit being 1. If this watermark bit is decoded to be −1 by hard decision, the noise will be amplified during the process of the iterative decoding. Since the digital watermark extracting apparatus 200 of the present embodiment does not make hard decision on the decoding results and gives the soft decision values to the second watermark remover 42 and the first watermark remover 43 to remove the watermarks, the amplification of the noise can be suppressed and the decoding results can be gradually improved by the iterative process. Therefore the bit error rate (BER) of the detected watermark can be further reduced.

If the ECC decoders 44 and 45 are iterative decoders themselves such as turbo decoders, the number of iterations in turbo decoding may be set in proportion to the number of iterations of the watermark decoding process and thereby BER can be further improved. Namely, since the reliability of the decoding results is low at the initial stage of the watermark iterative decoding process, the number of iterations in turbo decoding is set to be small. As the number of iterations of the watermark decoding becomes large, the number of the iterations in turbo decoding is set to be large. Thereby the reduction effect in the BER can be further heightened.

It is to be noted that the second watermark extracting block 210 and the first watermark extracting block 220 of the digital watermark extracting apparatus 200 of the present embodiment can be configured as those in a parallel type of the digital watermark extracting apparatus 200 of Embodiment 6.

According to the embodiments, when media data to be watermarked are given, the location in which a given watermark is to be stickily embedded can be detected depending on the media data, and the robustness of the watermark embedded in the media data can be improved. In addition, by the GS-based method, the watermark bit sequence can be converted to a bit sequence prone to be adhered to the media data and thereafter embedded. Therefore it is possible to make the digital watermark robust against signal processing, geometric transform, compression, attacks and so on, and thereby the detection accuracy in extracting the watermark is highly improved.

When the watermarks are sequentially extracted from the media data in which multiple watermarks are embedded, the next watermark is extracted after a previously extracted watermark is removed completely or nearly completely. Therefore erroneous detection caused by the interference from the multiple other watermarks can be prevented. In addition, by the iterative watermark decoding, the watermark bit errors can be gradually reduced and thereby the detection accuracy of the watermarks can be improved. Furthermore, by utilizing the soft decision values in the iterative watermark decoding, BER can be further reduced.

Although the present invention has been described by way of exemplary embodiments, it should be understood that many changes and substitutions may be made by those skilled in the art without departing from the scope of the present invention which is defined by the appended claims. Some such alterations are stated as follows.

The function blocks of the first watermark embedding block 110 and the second watermark embedding block 120 of Embodiment 4 may be applied to the actual-watermark embedder 112 and the meta-watermark embedder 122 of the Embodiment 1, and the actual-watermark and the meta-watermark may be embedded by the GS-based method. The function blocks of the first watermark embedding block 110 and the second watermark embedding block 120 of Embodiment 3 may be applied to the first watermark embedder 114 and the second watermark embedder 124 of the Embodiment 2, and the watermarking location information may be scrambled by the GS-based method.

The GS-based method is used for generating a plurality of candidate watermarks, in which a variety of candidates can be generated, however, the other scrambling methods are also applicable and the candidates may be randomly generated by some methods. In the embodiments, the original watermark is restored by unscrambling the watermark bits extracted from the host data, however, a table that associates the original watermark with a plurality of scrambled watermarks may be provided and the original watermark may be obtained by referring to the table.

The identification data used as initial data in the scrambling process are inserted at the head of watermark data and provided to the decoding apparatus, however, the identification data may not be embedded as the watermark and may be retained and managed as a secret key in the encoding apparatus. In this case, the decoding apparatus obtains the secret key and then descrambles the watermark. The identification data may be embedded in the host data as a new watermark.

In the above-mentioned embodiments, the second watermark is embedded after the first watermark is embedded, however, the order of watermarking can be reversed. Namely, the second watermark may be embedded before the first watermark is embedded and the first watermark may be embedded into the host data in which the second watermark has been embedded. In the case in which the watermarking location of the first watermark is embedded as the second watermark, the watermarking location of the first watermark is first determined, and the first watermark is not embedded but stored in a memory. Then, the watermarking location information on the first watermark is first embedded into the host data as the second watermark, and thereafter the first watermark is retrieved from the memory and embedded into the host data. In this case, the apparatus is so configured that the host data output from the second watermark embedding block 120, in which the second watermark has been embedded, is input to the first watermark embedding block 110 as the target host data to be watermarked.

What is claimed is:

1. A digital watermark embedding apparatus comprising:
    a first embedding block which embeds a first digital watermark in a host data; and
    a second embedding block which embeds information on watermarking location of the first digital watermark, as a second watermark, into the host data in which the first digital watermark has been embedded,
    wherein the first embedding block comprising:
    a location information generating unit which generates a plurality of candidate locations of the host data in which the first digital watermark is to be embedded;
    a first embedding unit which embeds the first digital watermark in the respective candidate locations of the host data and generates a plurality of candidates for a first watermarked host data;
    a first evaluating unit which evaluates robustness of the first digital watermark hidden in the respective candidates for the first watermarked host data; and
    a first selecting unit which selects one of the plurality of the candidates for the first watermarked host data according to the evaluated robustness and outputs the selected one as the host data in which the first digital watermark is embedded.

2. A digital watermark embedding apparatus comprising:
a first embedding block which embeds a first digital watermark in a host data; and
a second embedding block which embeds information on watermarking location of the first digital watermark, as a second watermark, into the host data in which the first digital watermark has been embedded,
wherein the second embedding block comprising:
a scrambling unit which scrambles the information on the watermarking location and generates a plurality of candidate watermarks;
a second embedding unit which embeds the respective candidate watermarks in the host data in which the first digital watermark has been embedded and generates a plurality of candidates for a second watermarked host data;
a second evaluating unit which evaluates robustness of the respective candidate watermarks hidden in the respective candidates for the second watermarked host data; and
a second selecting unit which selects one of the plurality of the candidates for the second watermarked host data according to the evaluated robustness.

3. A digital watermark embedding apparatus comprising:
a first embedding block which embeds a first digital watermark in a host data; and
a second embedding block which embeds information on watermarking location of the first digital watermark, as a second watermark, into the host data in which the first digital watermark has been embedded,
wherein the second embedding block comprising:
a scrambling unit which scrambles the information on the watermarking location and generates a plurality of candidate watermarks;
a second embedding unit which embeds the respective candidate watermarks in the host data in which the first digital watermark has been embedded and generates a plurality of candidates for a second watermarked host data;
a second evaluating unit which evaluates robustness of the respective candidate watermarks hidden in the respective candidates for the second watermarked host data; and
a second selecting unit which selects one of the plurality of the candidates for the second watermarked host data according to the evaluated robustness,
wherein the second embedding unit restricts the candidates for the second watermarked host data to be within an acceptable degradation range for the host data after the first digital watermark is embedded and to be within an acceptable degradation range for the original host data before the first digital watermark is embedded.

4. The apparatus of claim 3, wherein the second embedding unit relaxes a restriction so that a part of watermarked samples of the candidates for the second watermarked host data is allowed to be out of the acceptable degradation range for the original host data before the first digital watermark is embedded.

* * * * *